US010171757B2

(12) United States Patent
Tsukada

(10) Patent No.: US 10,171,757 B2
(45) Date of Patent: Jan. 1, 2019

(54) IMAGE CAPTURING DEVICE, IMAGE CAPTURING METHOD, CODED INFRARED CUT FILTER, AND CODED PARTICULAR COLOR CUT FILTER

(71) Applicant: NEC Corporation, Minato-ku, Tokyo (JP)

(72) Inventor: Masato Tsukada, Tokyo (JP)

(73) Assignee: NEC CORPORATION, Tokyo (JP)

(*) Notice: Subject to any disclaimer, the term of this patent is extended or adjusted under 35 U.S.C. 154(b) by 195 days.

(21) Appl. No.: 15/030,196

(22) PCT Filed: Oct. 14, 2014

(86) PCT No.: PCT/JP2014/005201
§ 371 (c)(1),
(2) Date: Apr. 18, 2016

(87) PCT Pub. No.: WO2015/059897
PCT Pub. Date: Apr. 30, 2015

(65) Prior Publication Data
US 2016/0255286 A1 Sep. 1, 2016

(30) Foreign Application Priority Data
Oct. 23, 2013 (JP) ................ 2013-220507

(51) Int. Cl.
H04N 5/33 (2006.01)
H04N 9/04 (2006.01)
G02B 5/20 (2006.01)

(52) U.S. Cl.
CPC ............. H04N 5/332 (2013.01); G02B 5/201 (2013.01); G02B 5/208 (2013.01); H04N 9/045 (2013.01)

(58) Field of Classification Search
CPC ........ H04N 5/332; H04N 9/045; G02B 5/201; G02B 5/208
See application file for complete search history.

(56) References Cited

U.S. PATENT DOCUMENTS

2011/0235017 A1* 9/2011 Iwasaki ............... H04N 5/2354
356/4.01

FOREIGN PATENT DOCUMENTS

JP H02-149244 A 6/1990
JP 2005-006066 A 1/2005
(Continued)

OTHER PUBLICATIONS

International Search Report for PCT Application No. PCT/JP2014/005201, dated Dec. 22, 2014.
English translation of Written opinion for PCT Application No. PCT/JP2014/005201.
(Continued)

Primary Examiner — Thai Q Tran
Assistant Examiner — Christopher Braniff

(57) ABSTRACT

Disclosed is an image capturing device that can easily perform image processing of visible light region and that of near infrared region, while utilizing a general image capturing device structure. The image capturing device comprises: a color filter that divides an incident light into a plurality of color lights; a photo sensor that converts the plurality of color lights as divided by the color filter to data representing image signals; a coded infrared cut filter that is placed before the color filter in the light proceeding direction or between the color filter and the photo sensor and that has infrared cut parts for cutting off near infrared lights and infrared passage parts for allowing near infrared lights to pass therethrough; and an image processing means that acquires a plurality of pieces of color information and a piece of near infrared information for each of a plurality of pixels on the basis of a plurality of image signals related to the lights having passed through the infrared cut parts and an
(Continued)

image signal related to the light having passed through the infrared passage part for each of the pixel and adjacent pixels.

19 Claims, 29 Drawing Sheets

(56) References Cited

FOREIGN PATENT DOCUMENTS

| JP | 2010-272666 | A | | 12/2010 |
|---|---|---|---|---|
| JP | 2011-015087 | A | | 1/2011 |
| JP | 2011-199798 | A | | 10/2011 |
| JP | 2011-243862 | A | | 12/2011 |
| JP | 2011243862 | | * | 12/2011 |
| JP | 2013-162339 | A | | 8/2013 |
| WO | 2010/134147 | A1 | | 11/2010 |
| WO | 2013/118337 | A1 | | 8/2013 |

OTHER PUBLICATIONS

Sosuke Matsui, Mihoko Shimano, Takahiro Okabe, Yoichi Sato, "Image Enhancement of Low-Light Scenes with Combination of Color Image and Near Infrared Images", The 12th Meeting on Image Recognition and Understanding (MIRU 2009), collection of papers, pp. 1089-1096, 2009.

Kayama, Tanaka, Hirose, "Day-and-night imager for security monitoring cameras", PanasonicTechnical Journal vol. 54, No. 4, Jan. 2009.

O. Losson, L. Macaire, Y. Yang, "Comparison of Color Demosaicking Methods", Advances in Imaging and Electron Physics, vol. 162, pp. 173-265, 2010.

R. Ramanath, W. Snyder, G. Bilbro, W. Sander, "Demosaicking methods for Bayer color array", J. Electronic Imaging, vol. 11, No. 3, pp. 306-315, 2002.

S. Ferradans, M. Bertalmio, V. Caselles, "Geometry-Based Demosaicking", IEEE Tras. on Image Processing, vol. 18, No. 3, pp. 665-670, 2009.

Japanese Office Action for JP Application No. 2015-543704 dated Oct. 16, 2018 with English Translation.

* cited by examiner

Fig. 34

IMAGE CAPTURING DEVICE, IMAGE CAPTURING METHOD, CODED INFRARED CUT FILTER, AND CODED PARTICULAR COLOR CUT FILTER

This application is a National Stage Entry of PCT/JP2014/005201 filed on Oct. 14, 2014, which claims priority from Japanese Patent Application 2013-220507 filed on Oct. 23, 2013, the contents of all of which are incorporated herein by reference, in their entirety.

TECHNICAL FIELD

The present invention relates to an image capturing technique, and in particular, to an image capturing technique pertaining to an image processing for a visible light region and a near infrared region.

BACKGROUND ART

Regarding image capturing devices such as digital cameras or video cameras, their image sensors usually include a red (R), green (G), blue (B) three-color optical filter. A light which has entered a camera is separated by such a three-color optical filter, and an image sensor converts the separated lights into image signals, thereby generating RGB image data.

When an image sensor which is used in an image capturing device is a silicon-based sensor, the image sensor is sensitive to a light in the visible light region to the near infrared region. On the other hand, since highly precise color reproduction is required for a digital camera or a video camera, a near infrared light which will adversely affect color reproduction is removed by a near infrared cut filter. This is because, while a R, G, B three-color optical filter secures the transmittance in a wavelength band in the visible light region for which each filter is responsible, there are some cases in which the transmittance characteristics of a light in the near infrared region which is outside the visible light region are not taken into consideration.

FIG. 1 is an example illustrating spectral transmittances of an RGB three-color optical filter. Assuming the visible light region to be wavelengths of 400 nm to 700 nm, each color filter is expected to have characteristics that a light having a wavelength of about 400 nm to 500 nm (a B filter), about 500 nm to 600 nm (a G filter), or about 600 nm to 700 nm (an R filter) is passed through. As illustrated in FIG. 1, it is however confirmed that each filter has characteristics that a light having a wavelength of 700 nm or longer which is outside the visible light region or a near infrared light is passed therethrough.

Incidentally, the spectral sensitivity characteristics of a photodiode image sensor which is generally employed in a color image input device such as a digital camera or a video camera also has a sensitivity in a wavelength region of 700 nm or longer. Only applying a three-color optical filter having the spectral characteristics of FIG. 1 as it is to an image sensor will cause a problem, from the viewpoint of color reproduction.

The color-matching functions of the XYZ color system for color perception of human beings are as illustrated in FIG. 2. Regarding color perception of human beings, the sensitivity to a light having a wavelength of 700 nm or longer is zero, and therefore, a light having a power in a wavelength region of 700 nm or longer does not influence perceived color which is a psychophysical quantity.

Now, as illustrated in FIG. 3, a case of observation of a light having a power in a wavelength region of 600 nm or longer will be taken into consideration. In the case of human beings, the light is perceived as red. On the other hand, when the light is observed with an image sensor by using a three-color optical filter having characteristics illustrated in FIG. 1, output signals of the sensor include not only an R value but also G and B values. As a result, a color which is different from a red color perceived by human beings is observed. As describe above, a cause of a problem of color reproduction is that the spectral transmittances are not zero in wavelength regions of 700 nm or longer of G and B optical filters.

In order to attain a highly precise color reproduction for color perception of human beings in a color image input device, an infrared light (IR: infrared) cut filter having a spectral transmittance which eliminates the influence of a near infrared light having a wavelength of 700 nm or longer as illustrated in FIG. 4 is used. Specifically, as illustrated in FIG. 5, an IR cut filter is incorporated into an optical system of a color image input device to intercept penetration of a near infrared light into a three-color optical filter and an image sensor. Due to such a configuration, a light having a power only in the wavelength region of a visible light is input to the three-color optical filter, and the lights separated by the three-color optical filter are input to the image sensor, whereby RGB signals are generated.

On the other hand, when an image is taken at nighttime out of doors or in a dark place, highly sensitive image capturing with reduced noise is demanded. In such a case, in order to reduce sensor noise caused by an insufficient quantity of light, it is desired that as large a quantity of light as possible is received by an image sensor. In order to attain highly sensitive image capturing in a dark place, a method of capturing an image by utilizing a light having a wavelength in the near infrared region is proposed. Examples of the simplest method include a method in which an IR cut filter set in an optical system is mechanically removed during highly sensitive image capturing. This method, however, not only increases the cost of products due to the increased number of parts thereof but has a major risk that it is highly probable that the product malfunctions during its long period of use since a mechanical action of removing the IR cut filter is required.

As a method of capturing an RGB image and an IR (NIR: Near Infra-Red) image without requiring a mechanical action, a method which uses two cameras capturing an RGB image and an IR image, respectively is proposed in NPL 1.

NPL 2 proposes an image sensor into which a four-color optical filter in which an IR filter passing through a near infrared (NIR) light is added to an RGB three-color optical filter is incorporated, as illustrated in FIG. 6. A second figure of NPL 2 illustrates the spectral sensitivity characteristics of each of the optical filters R, G, B, and IR. The spectral sensitivity characteristics of each of the color filters R, G, and B has a spectral sensitivity similar to that of the IR filter with respect to a near infrared light. When an image is taken in daylight, in order to attain a high color reproduction, influences of near infrared lights involved in R, G, and B need to be eliminated. An image sensor of NPL 2 generates R, G, and B signals while eliminating influences of near infrared lights involved in R, G, and B by utilizing an IR signal obtained by passing through the IR filter. When an image is taken at nighttime, all of the R, G, B, and IR signals are utilized.

PTL 1 proposes an image capturing device which generates R, G, B, and NIR signals by using an R, G, B three-color optical filter through which a near infrared light passes and by using a special photo sensor which senses a near infrared light (NIR). For example, a light which has passed through an R filter corresponds to R+NIR and are made incident to the photo sensor. The photo sensor is composed of a visible light sensor unit which detects R at a shallow position in the light incident direction and a non-visible light sensor unit which detects NIR at a deep position in the light incident direction. Regarding G and B, a similar configuration as mentioned above is employed.

NPL 3 illustrates one example of a method of demosaicing processing, which will be mentioned for explaining the present exemplary embodiment. NPL 4 illustrates a method using Gradient Based Interpolation which will be mentioned below. NPL 5 illustrates one example of a method of demosaicing processing. PTL 2 discloses an image capturing device which outputs a visible color image even in an environment in which a visible light signal is weak. PTL 3 discloses a color filter for solid-state image sensing devices and a color image capturing device using the color filter.

CITATION LIST

Patent Literature

PTL 1: Japanese Patent Application Laid-open Publication No. 2011-243862
PTL 2: Japanese Patent Application Laid-open Publication No. 2011-015087
PTL 3: Japanese Patent Application Laid-open Publication No. 2005-006066

Non-Patent Literature

NPL 1: Sosuke Matsui, Mihoko Shimano, Takahiro Okabe, Yoichi Sato, "Image Enhancement of Low-Light Scenes with Combination of Color Image and Near Infrared Images", The 12th Meeting on Image Recognition and Understanding (MIRU 2009), collection of papers, pp. 1089-1096, 2009
NPL 2: Kayama, Tanaka, Hirose, "Day-and-night imager for security monitoring cameras", Panasonic Technical Journal Vol. 54, No. 4, January, 2009
NPL 3: O. Losson, L. Macaire, Y. Yang, "Comparison of Color Demosaicking Methods", Advances in Imaging and Electron Physics, Vol. 162, p.p. 173-265, 2010
NPL 4: R. Ramanath, W. Snyder, G. Bilbro, W. Sander, "Demosaicking methods for Bayer color array", J. Electronic Imaging, Vol. 11, No. 3, p.p. 306-315, 2002
NPL 5: S. Ferradans, M. Bertalmio, V. Caselles, "Geometry-Based Demosaicking", IEEE Tras. on Image Processing, Vol. 18, No. 3, p.p. 665-670, 2009

SUMMARY OF INVENTION

Technical Problem

The method of NPL 1 has a problem that, although a high-resolution RGB image and NIR image can be generated by using two cameras, it is hard to make the image input device compact and the cost of the image input device becomes high. Although it is possible to incorporate the same method as described above into one device, it is hard to resolve the above-described problems since two optical paths RGB and NIR and two image sensors are needed.

The image sensors of NPL 2 and PTL 1 are a special image sensor for generating a near infrared image. In other words, the present image sensor is obtained by semiconductor manufacturing. It is hard to obtain such an image sensor and there is a problem that the cost of such an image sensor is higher than that of a usual image sensor at present.

An image capturing technique utilizing a configuration of a general image capturing device and which can perform image processing of a visible light region and a near infrared region is expected to be developed.

The present invention is to solve the above-described problems and an object of the present invention is to provide an image capturing technique utilizing a configuration of a general image capturing device and which can easily perform image processing of a visible light region and a near infrared region.

Solution to Problem

An aspect of the present invention to solve the above-described problems is an image capturing device including: a color filter which separates an incident light into a plurality of colors; a photo sensor which converts the plurality of colors which the color filter has separated into data representing image signals; a coded infrared cut filter which is provided in front of the color filter in the light traveling direction or between the color filter and the photo sensor, and which includes an infrared cut unit which cuts a near infrared light and an infrared transmissive unit which passes the near infrared light; and image processing means which acquires plural-color information and near infrared information of a pixel based on a plurality of image signals related to lights which pass the infrared cut unit of the pixel and adjacent pixels and an image signal related to a light which passes the infrared transmissive unit.

An aspect of the present invention to solve the above-described problems is a coded infrared cut filter including an infrared cut unit which cuts a near infrared light and an infrared transmissive unit which passes the near infrared light.

An aspect of the present invention to solve the above-described problems is a coded infrared cut filter including: an infrared cut unit which cuts a near infrared light; and an infrared transmissive unit which passes the near infrared light, corresponding to a color filter of an arrangement type in which a plural-color 2×2 pixels arrangement is a minimum unit, a site to which the plurality of minimum unit arrangements in the number of N are adjacent being a basic unit, wherein in the basic unit, the infrared transmissive units are included in the number of N or more and a pixel position corresponding to the infrared transmissive unit in one minimum unit arrangement and a pixel position corresponding to the infrared transmissive unit in another minimum unit arrangement are different from each other by one or more.

Advantageous Effects of Invention

According to the present invention, image processing of a visible light region and a near infrared region can be performed by, while utilizing a configuration of a general image capturing device, only adding a simple configuration thereto.

BRIEF DESCRIPTION OF DRAWINGS

FIG. 34 is output image data corresponding to pattern 2 to 3 in the seventh exemplary embodiment.

DESCRIPTION OF EMBODIMENTS

In the following, exemplary embodiments (1 to 7) of the present invention will be described with reference to the drawings.

First Exemplary Embodiment

[Configuration]

Figure 7:
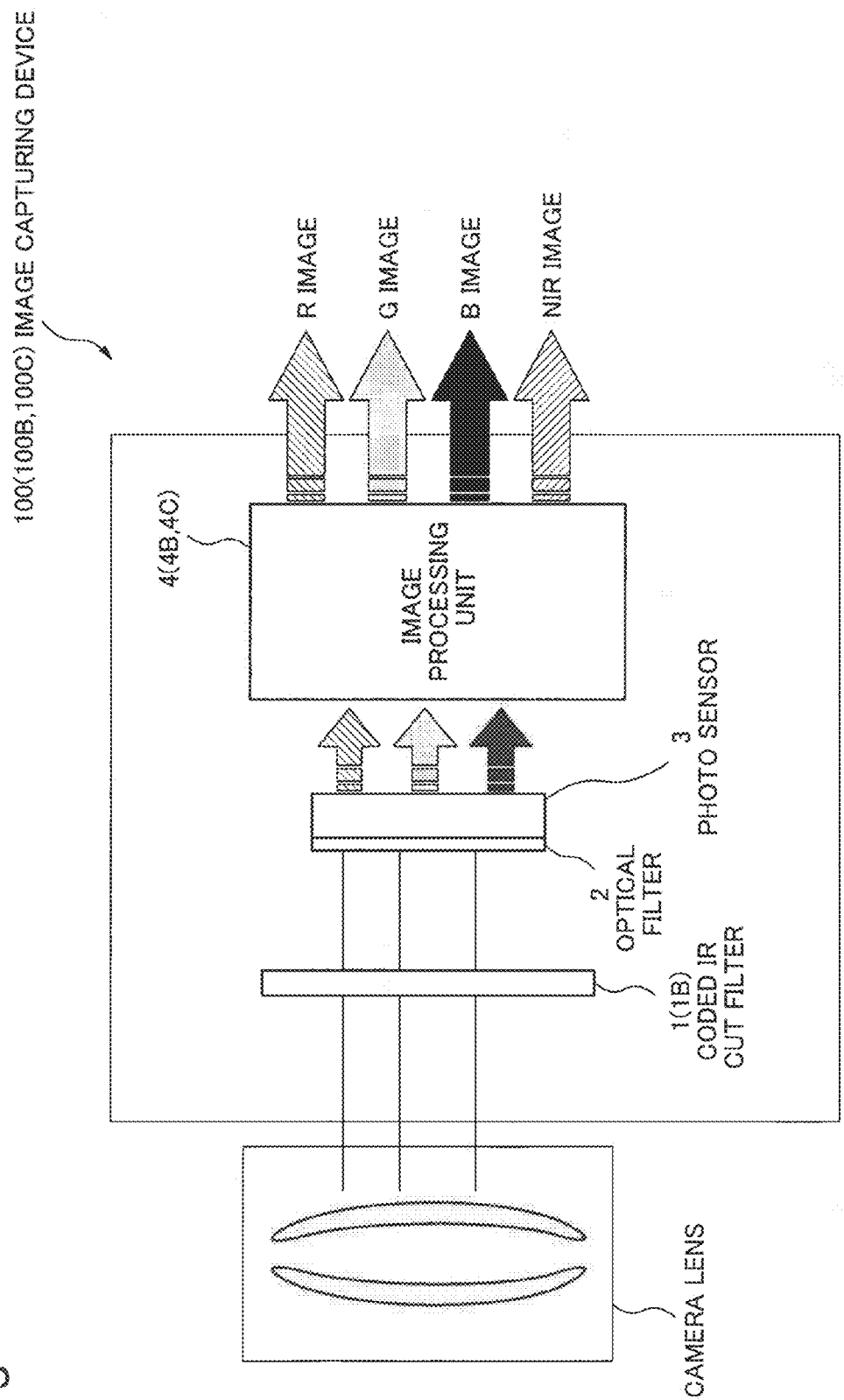
FIG. 7 is a schematic diagram of an image capturing device in a first exemplary embodiment.

FIG. 7 is a schematic diagram of an image capturing device 100 in a first exemplary embodiment of the present invention.

The image capturing device 100 in the first exemplary embodiment of the present invention includes a coded IR cut filter 1, an optical filter 2, a photo sensor 3, and an image processing unit 4. A usual camera lens may be used. For the optical filter 2 and the photo sensor 3, an optical filter and a photo sensor which is currently generally used in a color image input device (or an image capturing device). In other words, the spectral characteristics of the optical filter 2 are similar to FIG. 1. In FIG. 7, reference signs 100B, 100C, 1B, 4B, and 4C are reference signs representing a configuration described in the following third or sixth exemplary embodiment, and are not used in the present exemplary embodiment.

Figure 8:
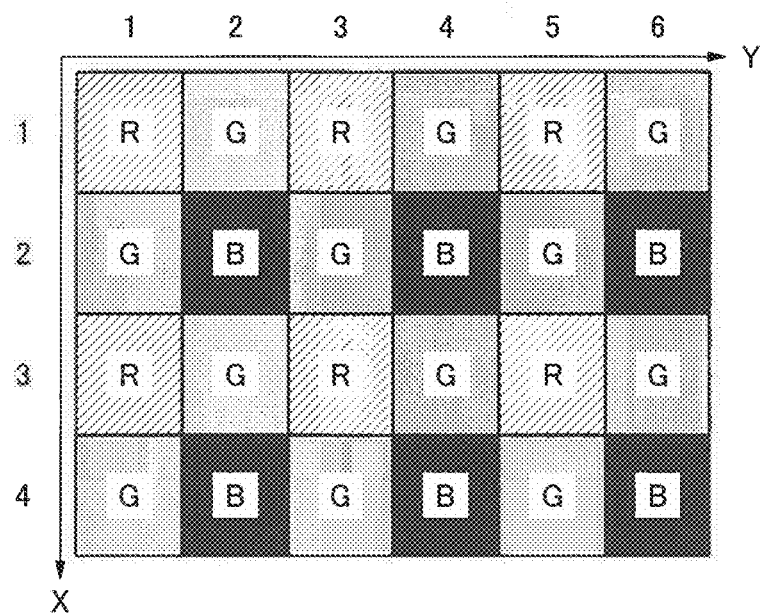
FIG. 8 is a photo sensor into which a Bayer arrangement type color filter is incorporated.

FIG. 8 is an outline of the optical filter 2 and the photo sensor 3. The three-color arrangement composed of R, G, and B in the optical filter illustrated in FIG. 8 is referred to as Bayer arrangement type. Any one of R, G, and B is assigned to one pixel of a photo sensor to correspond to R, G, or B in an optical filter.

Figure 9:
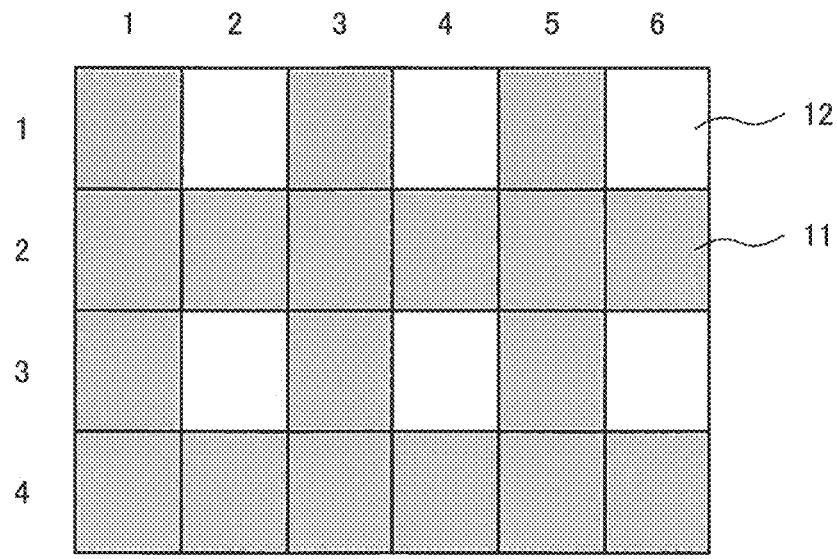
FIG. 9 is an outline of a coded IR cut filter in the first exemplary embodiment.

FIG. 9 is an outline of the coded IR cut filter 1. The coded IR cut filter 1 is a filter to which two patterns which are a portion (infrared cut unit 11) cutting a near infrared light (NIR) and a portion (infrared transmissive unit 12) passing the near infrared light are applied. In other words, the coded means two values, passing and cutting.

Although the coded IR cut filter 1 is generally provided in front of the optical filter 2 in the light traveling direction, the coded IR cut filter 1 may be provided between the optical filter 2 and the photo sensor 3.

The infrared transmissive unit 12 of the coded IR cut filter 1 is arranged corresponding to a G filter of the optical filter 2.

A light which has passed through the coded IR cut filter 1 and optical filter 2 is converted into three color signals R, G, and B at the photo sensor 3.

The image processing unit 4 generates image data composed of four color signals for R, G, B, and NIR based on image data composed of three color signals for R, G, and B. The detailed description will be made below.

[Operation]

Next, the operation of the image capturing device 100 will be described. An incident light to the image capturing device 100 through a camera lens is separated into a light in which a near infrared light is cut and a light including a near infrared light by the coded IR cut filter 1. The separated two types of lights are made incident on the photo sensor 3 into which a Bayer type color filter array (optical filter) 2 is incorporated.

Figure 10:
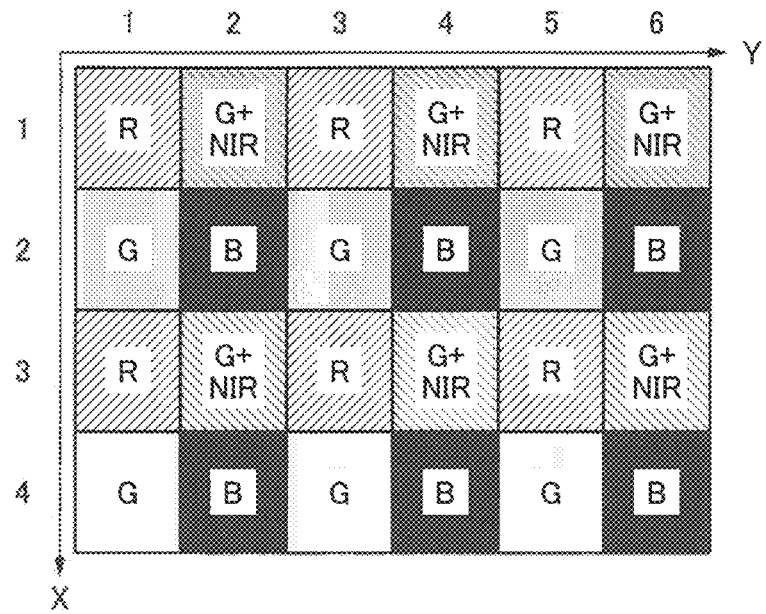
FIG. 10 is an example of RGB image data which a photo sensor in the first exemplary embodiment outputs.

FIG. 10 represents a color signal component in each pixel of RGB image data which the photo sensor 3 outputs.

In the present exemplary embodiment, each G filter in the Bayer arrangement of the optical filter 2 includes a partner G filter. The infrared transmissive unit 12 of the coded IR cut filter 1 is arranged corresponding to one of a pair of G filters included in the optical filter 2.

Accordingly, a light passing the infrared cut unit 11 and the optical filter 2 generates an R signal, a G signal, and a B signal. On the other hand, a light passing the infrared transmissive unit 12 and the optical filter 2 generates a G signal including a near infrared light component. Here, the G signal including a near infrared light component is designated as "G+NIR".

In other words, the photo sensor 3 outputs RGB three channels image data, and a G signal includes a G signal in which a near infrared light is cut and a G+NIR signal including a near infrared light.

The image processing unit 4 generates four channels image data for R, G, B, and NIR by applying demosaicing processing based on three channels image data for R, G, and B output from the photo sensor 3. The image processing unit 4 generates an absent color signal for all pixels in image data by demosaicing processing to generate four channels image data for R, G, B and NIR.

Figure 11:
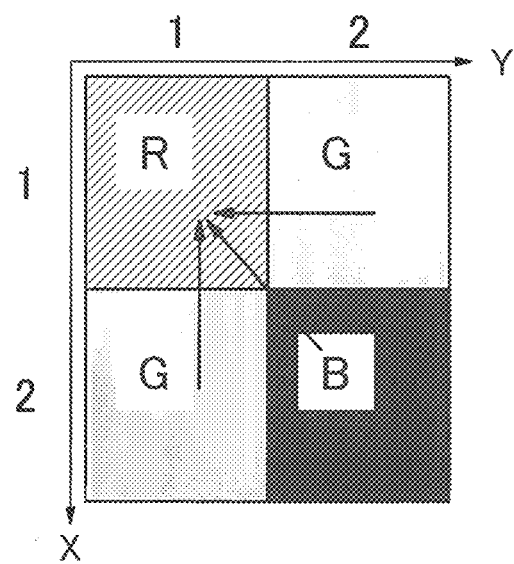
FIG. 11 is an example of general demosaicing processing.

First, one example of general demosaicing processing will be described with reference to FIG. 11. As illustrated in FIG. 11, each pixel included in an image has a coordinate value in the X-Y coordinate system.

First, the image processing unit 4 acquires image data (R, G, B color information) of a pixel of the coordinate value (1,1) in an image illustrated in FIG. 11. Since the pixel of the coordinate value (1,1) corresponds to R, the image processing unit 4 directly acquires an R value.

$R(1,1)=R(1,1)$

The image processing unit 4 calculates a G value and a B value which are absent in the pixel of the coordinate value (1,1) by, for example, interpolating from color information of its neighboring pixel as described below.

$G(1,1)=(G(2,1) \pm G(1,2))/2$ $B(1,1)=B(2,2)$

Next, the image processing unit 4 acquires image data (R, G, B color information) of a pixel of the coordinate value (1,2). Since the pixel of the coordinate value (1,2) corresponds to G, the image processing unit 4 directly acquires a G value.

$G(1,2)=G(1,2)$

The image processing unit 4 also calculates an R value and a B value which are absent in the pixel of the coordinate value (1,2) by interpolating from color information of its neighboring pixel in a similar manner to the above.

$R(1,2)=R(1,1)$ $B(1,2)=B(2,2)$

The image processing unit 4 repeats the above-described processing to acquire image data (R, G, B color information) for all pixels. The demosaicing processing is not limited to the above-described method, and a variety of method described in NPL 3 may be used.

Next, the image processing unit 4 applies the above-described general demosaicing processing to one sheet of image data (see FIG. 10) including four color signals for R, G, B, and G+NIR to generate image data composed of four channels color signal in which R, G, B, and NIR are assigned to all pixels. The above-described demosaicing processing may be applied to R and B.

Figure 12:
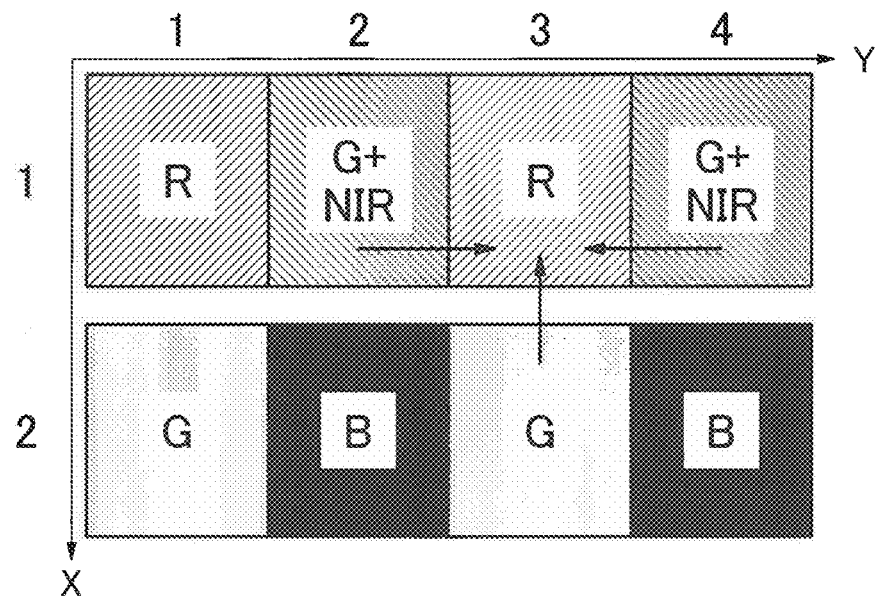
FIG. 12 is an example of characteristic demosaicing processing.

Demosaicing processing to G and NIR will be described utilizing FIG. 12 which is a part cut out from the image data illustrated in FIG. 10. Here, G+NIR illustrated in the drawing is referred to as "GNIR" for convenience.

A pixel of the coordinate value (1,3) will be described. The image processing unit 4 calculates a G value and an NIR value which are absent in the pixel of the coordinate value (1,3) by interpolating from color information of its neighboring pixel in a similar manner to the above.

$NIR(1,3)=(GNIR(1,2)+GINR(1,4))/2-G(2,3)$ $G(1,3)=G(2,3)$

Figure 13:
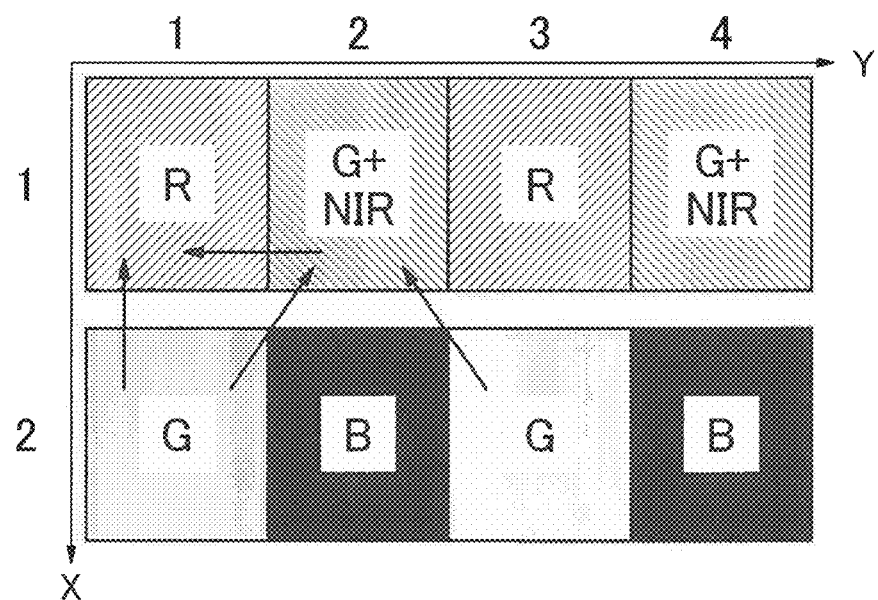
FIG. 13 is an example of characteristic demosaicing processing.

For reference, a G value and an NIR value in the coordinate value (1,1) and the coordinate value (1,2) can be calculated as follows (see FIG. 13).

$G(1,1)=G(2,1)$ $NIR(1,1)=GNIR(1,2)-G(2,1)$ $G(1,2)=(G(2,1)+G(2,3))/2$ $NIR(1,2)=GNIR(1,2)-(G(2,1)+G(2,3))/2$

The image processing unit 4 repeats the above-described processing and acquires image data (R, G, B, NIR) for all pixels. A demosaicing method is not limited to the above-described methods, and a variety of demosaicing methods described in NPL 2 can be applied.

Further, the image processing unit 4 mainly utilizes R, G, B information to perform image processing of a visible light region, and mainly utilizes NIR information to perform image processing of a near infrared region.

Advantageous Effects

The image capturing device 100 of the present exemplary embodiment is obtained by adding the coded IR cut filter 1 to a configuration of a general image capturing device (see FIG. 5), the optical filter 2 and the photo sensor 3. The coded IR cut filter 1 has a simple configuration obtained by a simple modification of a general cut filter. In other words, only adding a simple configuration to a configuration similar to a related art, image processing of a visible light region and a near infrared region becomes possible.

As a result, the image capturing device 100 can be produced in a large amount at a low cost. Further, since an additional configuration is simple, the image capturing device 100 causes little failure.

Second Exemplary Embodiment

Figure 14:
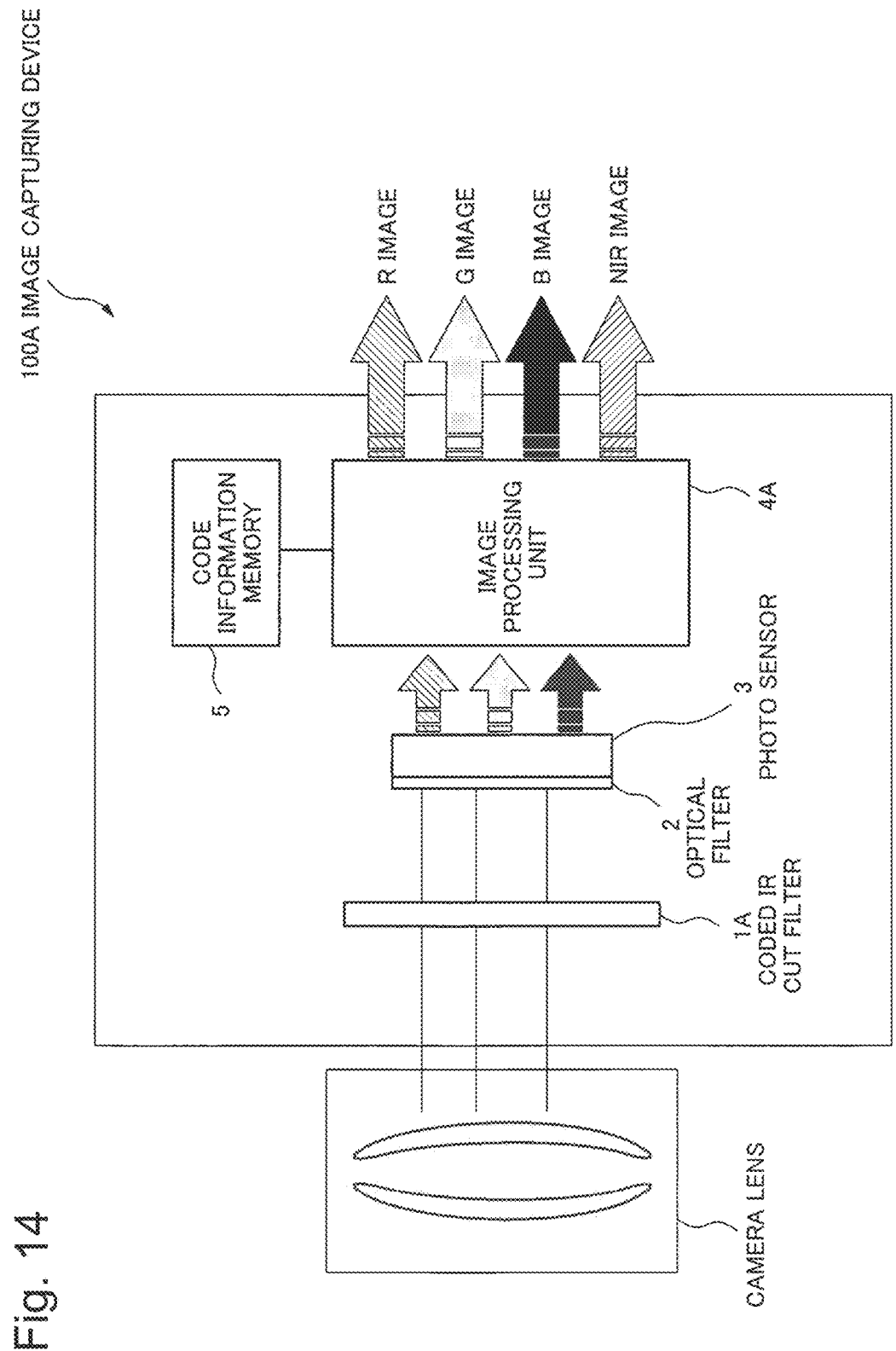
FIG. 14 is a schematic diagram of an image capturing device in a second exemplary embodiment.

FIG. 14 is a schematic diagram of an image capturing device 100A in another exemplary embodiment.

The image capturing device 100A includes a coded IR cut filter 1A, an optical filter 2, a photo sensor 3, an image processing unit 4A, and a code information memory 5. For the optical filter 2 and the photo sensor 3, an optical filter and a photo sensor which are used for a general image capturing device are used in a similar manner to the first exemplary embodiment.

Figure 15:
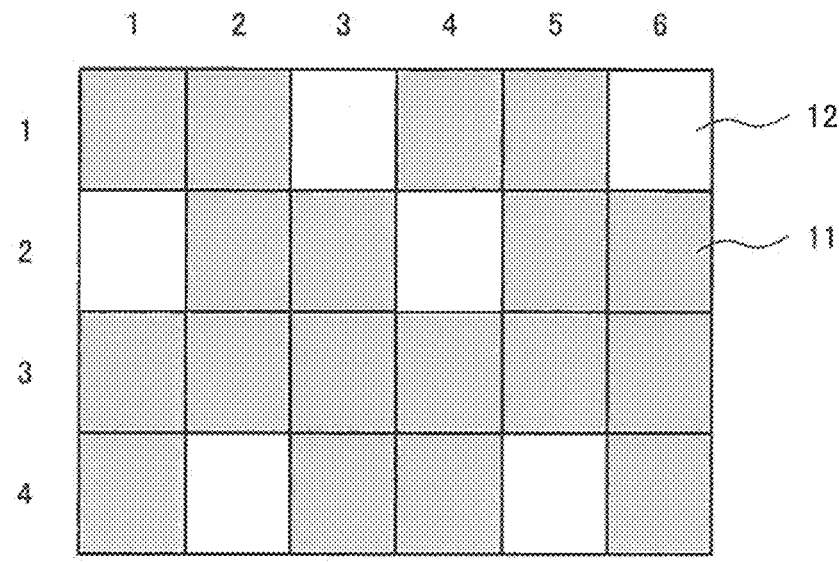
FIG. 15 is an outline of a coded IR cut filter in the second exemplary embodiment.

FIG. 15 is an outline of the coded IR cut filter 1A. In the first exemplary embodiment, the infrared transmissive unit 12 of the coded IR cut filter 1 is arranged corresponding to one of a pair of G filters included in the optical filter 2. On the other hand, in the second exemplary embodiment, the infrared transmissive unit 12 of the coded IR cut filter 1A is not restricted to one of R, G, and B, and is arranged corresponding to any color filter of a pair of plural-color arrangements. The color filter is randomly selected.

The code information memory 5 stores pixel position information corresponding to the infrared transmissive unit 12 of the coded IR cut filter 1A, or corresponding color filter information (R, G, B).

An incident light to the image capturing device 100A is separated into a light in which a near infrared light is cut and a light including a near infrared light by the coded IR cut filter 1A. The separated two types of lights are made incident on the photo sensor 3 into which a Bayer arrangement type color filter 2 is incorporated.

Figure 16:
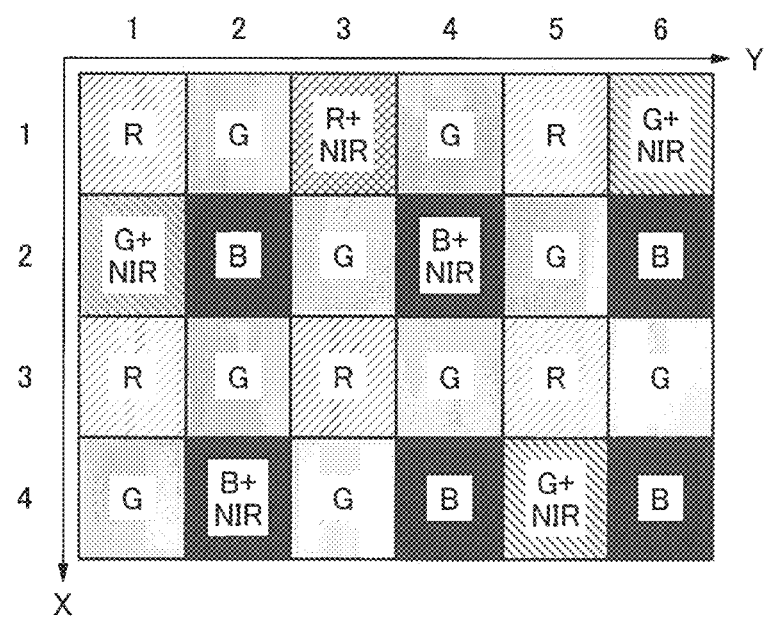
FIG. 16 is an example of RGB image data which a photo sensor in the second exemplary embodiment outputs.

FIG. 16 represents a color signal component in each pixel of RGB image data which the photo sensor 3 outputs. There are a pixel in which NIR is added to a signal of R, G, or B and a signal of R, G, or B in which NIR is cut.

The image processing unit 4A generates image data composed of four color signals for R, G, B, and NIR based on image data composed of three color signals for R, G, and B. The image processing unit 4A determines the position of a pixel in which NIR is added to a signal of R, G, or B based on information from the code information memory 5.

First, the image processing unit 4A acquires image data (R, G, B, NIR information) of a pixel of the coordinate value (1,1). Since the pixel of the coordinate value (1,1) corresponds to R, the image processing unit 4A directly acquires an R value.

The image processing unit 4A calculates G, B, and NIR which are absent in the pixel of the coordinate value (1,1) in the following manner. The following calculation of an NIR value is an example in a case in which only one pixel having a color signal including NIR is adjacent thereto.

$G(1,1)=G(1,2)$ $B(1,1)=B(2,2)$ $NIR(1,1)=GNIR(2,1)-G(1,2)$

Next, the image processing unit 4A acquires image data (R, G, B, NIR information) of the pixel of the coordinate value (1,2). Since the pixel of the coordinate value (1,2) corresponds to G, the image processing unit 4A directly acquires an G value.

The image processing unit 4A calculates an R value and a B value which are absent in the pixel of the coordinate value (1,2) by interpolating from color information of its neighboring pixel.

The image processing unit 4A calculates NIR in the following manner. The following calculation of an NIR value is an example in a case in which two pixels having a color signal including NIR are adjacent thereto.

$NIR(1,2)=RNIR(1,3)-R(1,1),$ $NIR(1,2)=GNIR(2,1)-G(1,2),$ or $NIR(1,2)=(RNIR(1,3)-R(1,1)+GNIR(2,1)-G(1,2))/2$ may be selected.

The image processing unit 4A repeats the above-described processing, and acquires image data (R, G, B, NIR) for all pixels.

The image capturing device 100A of the present exemplary embodiment also utilizes the optical filter 2 and the photo sensor 3 which have configurations similar to those of a related art, and can obtain a similar effect to that of the first exemplary embodiment.

Third Exemplary Embodiment

An image capturing device 100B includes a coded IR cut filter 1B, an optical filter 2, a photo sensor 3, and an image processing unit 4B. In other words, the image capturing device 100B has a similar configuration to that of the schematic configuration (FIG. 7) of the first exemplary embodiment.

Figure 17:
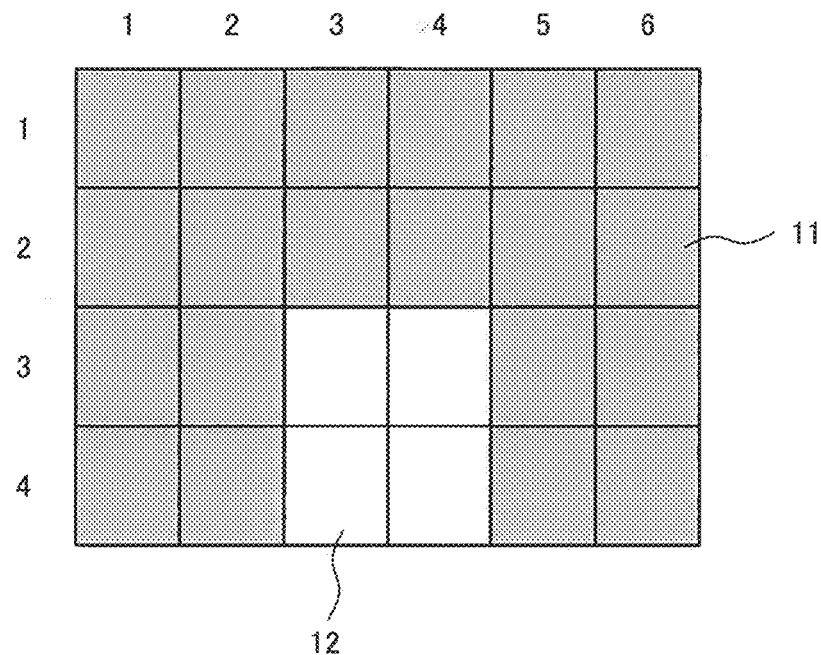
FIG. 17 is an outline of a coded IR cut filter in a third exemplary embodiment.

FIG. 17 is an outline of the coded IR cut filter 1B. In the second exemplary embodiment, the infrared transmissive unit 12 of the coded IR cut filter 1A is arranged corresponding to any color filter of a pair of plural-color arrangements (R, G, B). On the other hand, in a third exemplary embodiment, the infrared transmissive unit 12 of the coded IR cut filter 1B is arranged corresponding to a pair of plural-color arrangements. Around the infrared transmissive unit 12, the infrared cut unit 11 is arranged corresponding to a pair of plural-color arrangements.

In other words, while in the first and second exemplary embodiments, code information is added for a pixel unit, in the third exemplary embodiment, code information is added for an arrangement unit (2×2 pixels) unit.

An incident light to the image capturing device 100B is separated into a light in which a near infrared light is cut and a light including a near infrared light by the coded IR cut filter 1B. The separated two types of lights are made incident on the photo sensor 3 into which the Bayer arrangement type color filter 2 is incorporated.

Figure 18:
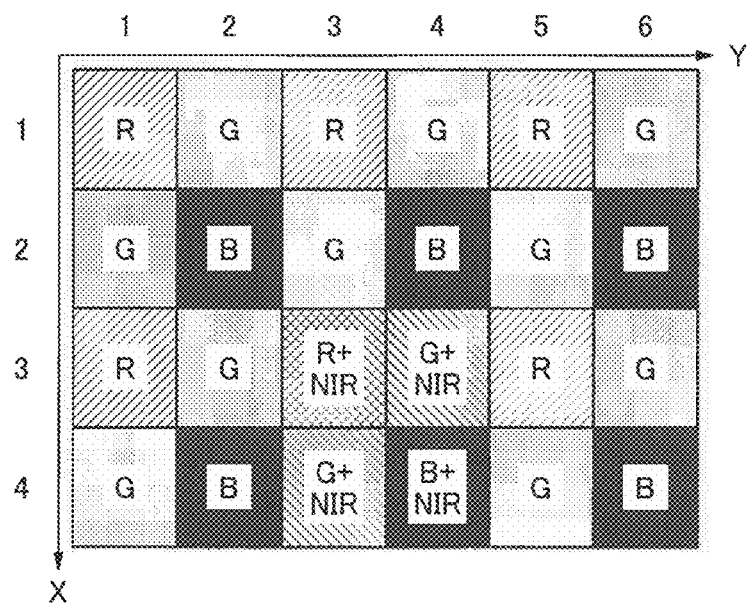
FIG. 18 is an example of RGB image data which a photo sensor in the third exemplary embodiment outputs.

FIG. 18 represents a color signal component in each pixel of RGB image data which the photo sensor 3 outputs. There are a pixel in which NIR is added to a signal of R, G, or B and a signal of R, G, or B in which NIR is cut. NIR is added to each of the pixels of coordinate values (3,3), (3,4), (4,3), and (4,4).

The image processing unit 4B generates image data composed of four color signals for R, G, B, and NIR based on image data composed of three color signals for R, G, and B.

First, the image processing unit 4B acquires image data (R, G, B, NIR information) of the pixel of the coordinate value (1,1). Since the pixel of the coordinate value (1,1) corresponds to R, the image processing unit 4B directly acquires an R value. The image processing unit 4B calculates a G value and a B value which are absent in the pixel of the coordinate value (1,1) by interpolation from color information of its neighboring pixel.

The image processing unit 4B calculates an NIR value which is absent in the pixel of the coordinate value (1,1) in the following manner.

$NIR(1,1)=RNIR(3,3)-R(1,1)$

Next, the image processing unit 4B acquires image data (R, G, B, NIR information) of the pixel of the coordinate value (1,2). Since the pixel of the coordinate value (1,2) corresponds to G, the image processing unit 4B directly acquires a G value. The image processing unit 4B calculates an R value and a B value which are absent in the pixel of the coordinate value (1,2) by interpolation from color information of its neighboring pixel.

The image processing unit 4B calculates an NIR value which is absent in the pixel of the coordinate value (1,2) in the following manner.

NIR(1,2)=(GNIR(4,3)+GNIR(3,4))/2−G(1,2)

The image processing unit 4B repeats the above-described processing, and acquires image data (R, G, B, NIR) for all pixels.

The image capturing device 100B of the present exemplary embodiment also utilizes the optical filter 2 and the photo sensor 3 which have a similar configuration to that of a related art, and can obtain a similar effect to that of the first exemplary embodiment.

Further, the coded IR cut filter 1B has a simpler configuration. As a result, the above-described effect is improved.

Fourth Exemplary Embodiment

In the first to third exemplary embodiments, the present invention is applied to an image capturing device in which a light is separated by a Bayer arrangement type optical filter, but the present invention is not limited thereto. For example, the present invention can also be applied to a three-plate type image capturing device.

Figure 19:
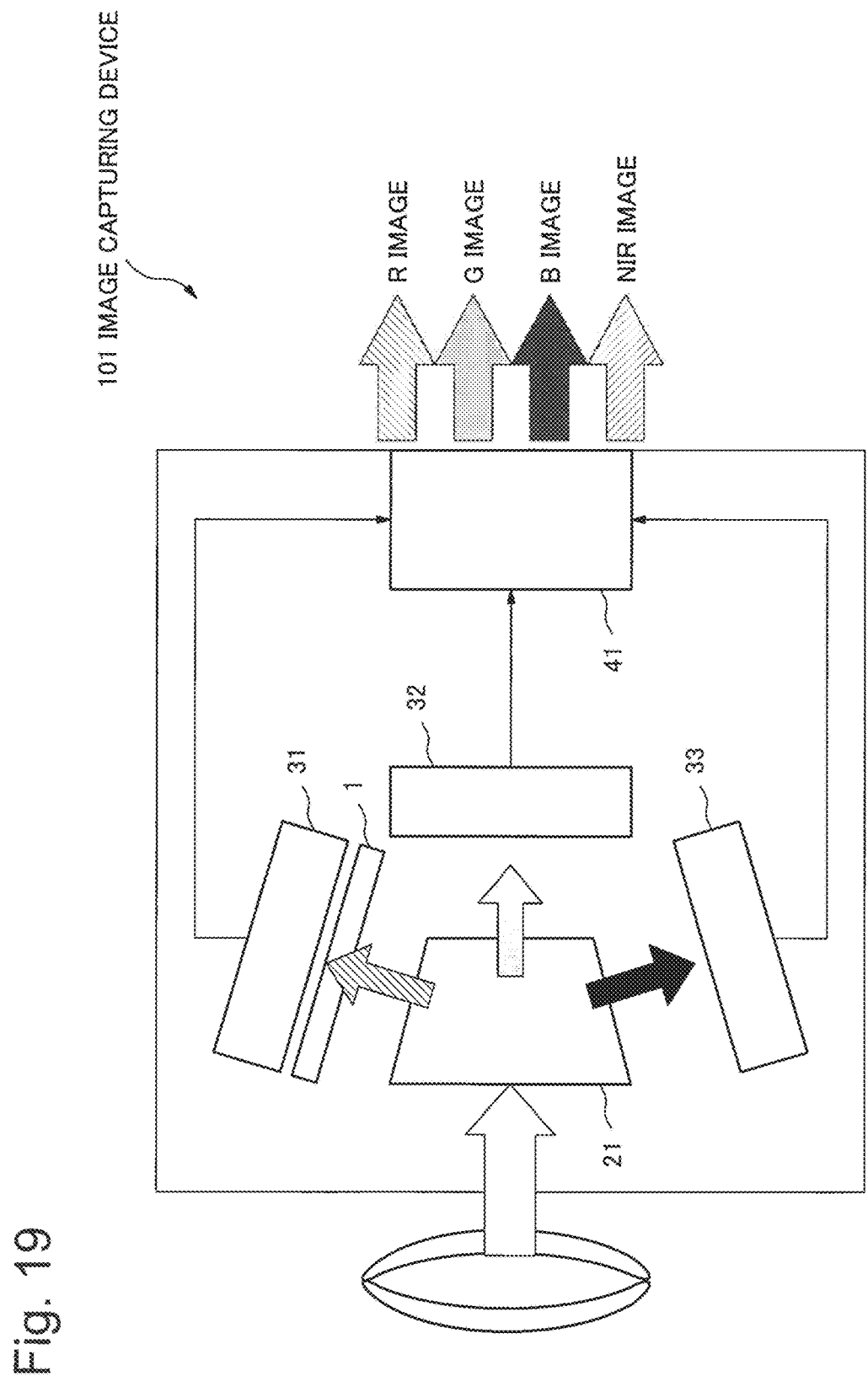
FIG. 19 is a schematic diagram of an image capturing device in a fourth exemplary embodiment.

FIG. 19 is a schematic diagram of an image capturing device 101 in another exemplary embodiment of the present invention.

The image capturing device 101 which is another exemplary embodiment of the present invention includes the coded IR cut filter 1, a prism (color separation unit) 21, photo sensors 31 to 33, and an image processing unit 41. A usual camera lens may be used. For the prism 21 and the photo sensors 31 to 33, a prism and photo sensors which are currently generally used in a three-plate type image capturing device may be used.

The coded IR cut filter 1 which is used in the first to third exemplary embodiments is applied.

The coded IR cut filter 1 is provided in front of at least one of the photo sensors 31 to 33 in the light traveling direction. One example in which the coded IR cut filter is provided corresponding to the photo sensor 31 which corresponds to R is illustrated. A normal infrared cut filter may be provided to the remaining two photo sensors in which a coded infrared cut filter is not provided in order to cut a near infrared light which can leak from the prism 21 in consideration of the color reproduction. Here, the description will be made assuming that lights of G and B separated in the prism 21 do not include a near infrared light.

An incident light to the image capturing device 101 through a camera lens is separated by the prism 21 into lights of R, G, and B whose bands of wavelength are different. A light corresponding to R is made incident on the photo sensor 31, a light corresponding to G is made incident on the photo sensor 32, and a light corresponding to B is made incident on the photo sensor 33.

At this time, a light corresponding to R is separated into a light in which a near infrared light is cut and a light including a near infrared light by the coded IR cut filter 1.

Figure 20:
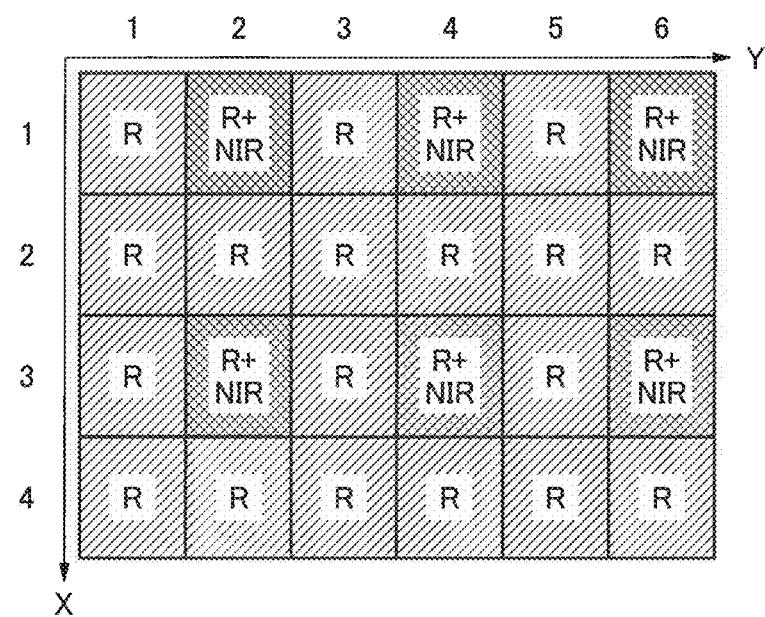
FIG. 20 is an example of RGB image data which a photo sensor in the fourth exemplary embodiment outputs.

FIG. 20 represents a color signal component in each pixel of R image data which the photo sensor 31 outputs. There are an R signal in which a near infrared light is cut and an R+NIR signal including a near infrared light.

The image processing unit 41 acquires image data (R, NIR) for all pixels based on R image data which the photo sensor 31 outputs.

The image processing unit 41 acquires image data (G) for all pixels based on image data which the photo sensor 32 outputs, and acquires image data (B) for all pixels based on image data which the photo sensor 33 outputs.

By this, the image processing unit 41 acquires image data (R, G, B, NIR) for all pixels.

The image capturing device 101 of the present exemplary embodiment is obtained by adding the coded IR cut filter 1 to a configuration of a general three-plate type image capturing device, the prism 21 and the photo sensors 31 to 33. The coded IR cut filter 1 has a simple configuration obtained by a simple modification of a general cut filter. In other words, only adding a simple configuration to a configuration similar to a related art, image processing of a visible light region and a near infrared region becomes possible, whereby reduction of production cost and reduction of malfunctions can be expected.

Fifth Exemplary Embodiment

In the first to third exemplary embodiments, the present invention is applied to an image capturing device in which a light is separated by a Bayer arrangement type optical filter, but the present invention is not limited thereto. For example, the present invention can also be applied to an image capturing device including a layered sensor.

Figure 21:
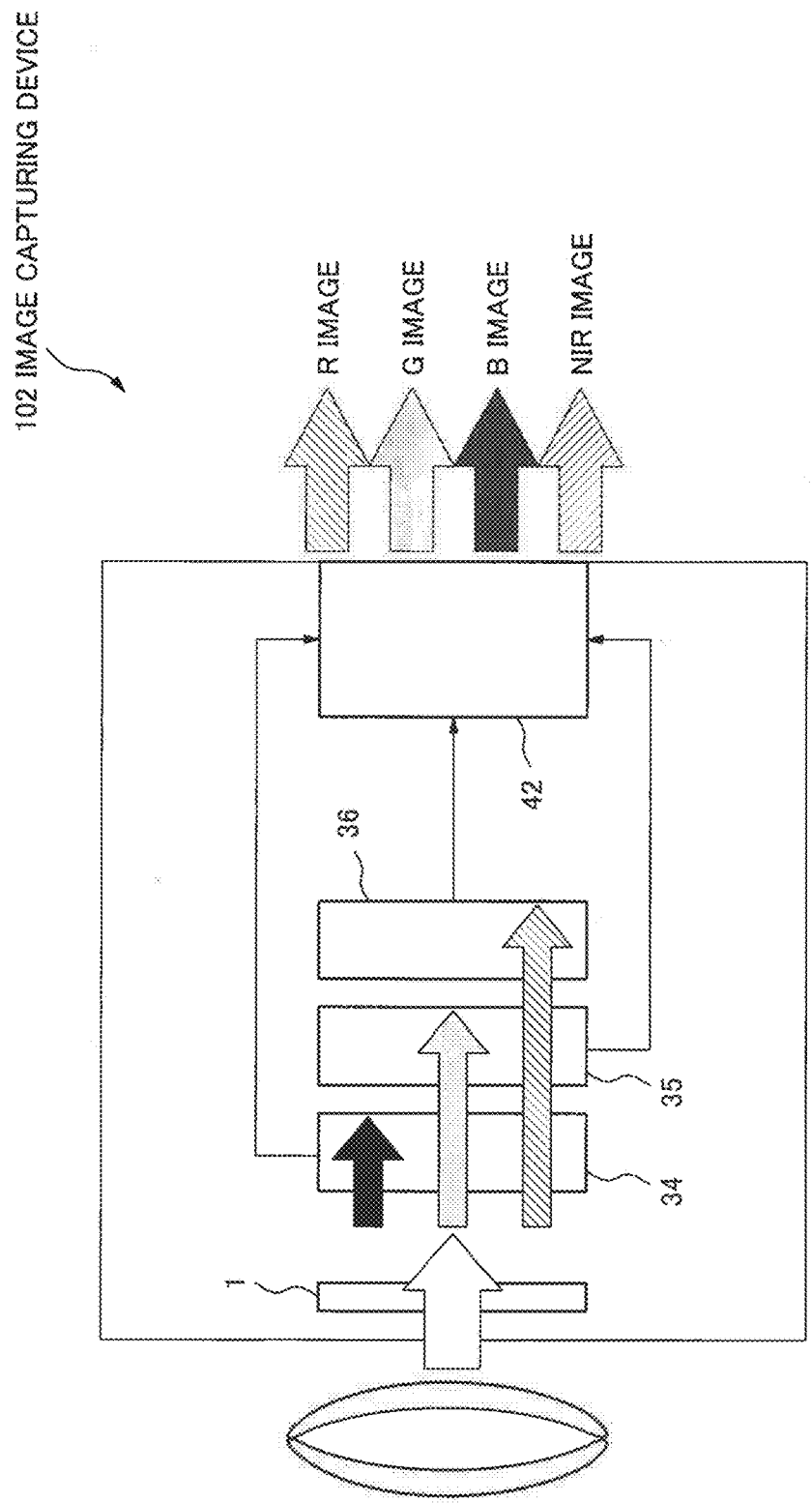
FIG. 21 is a schematic diagram of an image capturing device in a fifth exemplary embodiment.

FIG. 21 is a schematic diagram of an image capturing device 102 in an exemplary embodiment of the present invention.

The image capturing device 102 which is another exemplary embodiment of the present invention includes the coded IR cut filter 1, a layered sensor in which photo sensors 34 to 36 are layered, and an image processing unit 42. A usual camera lens may be used. For the layered sensors 34 to 36, a layered sensor which is currently generally used in a layered sensor type image capturing device may be used.

The layered sensor is layered in the order of sensors 34, 35, and 36 in the light traveling direction. The sensor 34 is sensitive to a band of wavelength of B, the sensor 35 is sensitive to a band of wavelength of G, and the sensor 36 is sensitive to a band of wavelength of R.

The coded IR cut filter 1 which is used in the first to third exemplary embodiments is applied.

The coded IR cut filter 1 is provided in front of the layered sensor in the light traveling direction.

An incident light to the image capturing device 101 through a camera lens includes lights of R, G, B and NIR whose bands of wavelength are different. A light corresponding to B is converted to a signal by the sensor 34, a light corresponding to G is converted to a signal by the sensor 35, and a light corresponding to R and NIR is converted to a signal by the sensor 36.

At this time, a light corresponding to R is separated into a light in which a near infrared light is cut and a light including a near infrared light by the coded IR cut filter 1.

In other words, the sensor 36 outputs an R signal in which a near infrared light is cut and an R+NIR signal including a near infrared light. The output results are similar to FIG. 20.

The image processing unit 42 acquires image data (R, NIR) for all pixels based on R image data which the sensor 36 outputs.

The image processing unit 42 acquires image data (G) for all pixels based on image data which the sensor 35 outputs, and acquires image data (B) for all pixels based on image data which the sensor 36 outputs.

By this, the image processing unit 42 acquires image data (R, G, B, NIR) for all pixels.

The image capturing device 102 of the present exemplary embodiment is obtained by adding the coded IR cut filter 1 to a configuration of a general layered sensor type image capturing device, layered sensors 34 to 36. The coded IR cut filter 1 has a simple configuration obtained by a simple modification of a general cut filter. In other words, only adding a simple configuration to a configuration similar to a related art, image processing of a visible light region and a near infrared region becomes possible, whereby reduction of production cost and reduction of malfunctions can be expected.

Sixth Exemplary Embodiment

Figure 22:
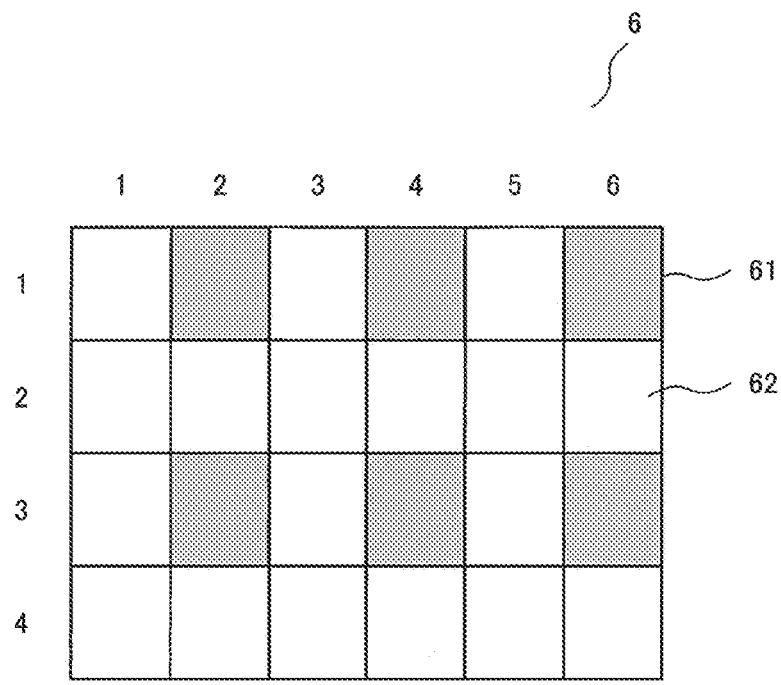
FIG. 22 is an outline of a coded particular color cut filter in a sixth exemplary embodiment.

In the first to fifth exemplary embodiments, the coded IR cut filter 1 of the present invention includes the infrared cut unit 11 and the infrared transmissive unit 12, but the present invention is not limited thereto. For example, a coded particular color cut filter 6 may be used. FIG. 22 is a diagram illustrating an outline of the coded particular color cut filter 6. As illustrated in FIG. 22, for example, the coded particular color cut filter 6 includes: a particular color cut unit 61 which cuts a visible light region including a band of wavelength related to a particular color and which passes a near infrared light whose wavelength is longer than a visible light region; and a particular color transmissive unit 62 which passes a light in the band of wavelength.

An image capturing device 100C includes the coded particular color cut filter 6, the optical filter 2, the photo sensor 3, and an image processing unit 4C. In other words, the image capturing device is similar to the schematic configuration (FIG. 7) of the first exemplary embodiment except for the coded cut filter.

The coded particular color cut filter 6 is generally provided in front of the optical filter 2 in the light traveling direction, and may be provided between the optical filter 2 and the photo sensor 3.

The particular color cut unit 61 of the coded particular color cut filter 6 is arranged corresponding to the G filter of the optical filter 2. The particular color cut unit 61 passes a near infrared light and at the same time cuts a visible light region including a band of wavelength related to a particular color G. The particular color transmissive unit 62 passes a near infrared light and at the same time passes a light of a band of wavelength related to a particular color G.

Figure 23:
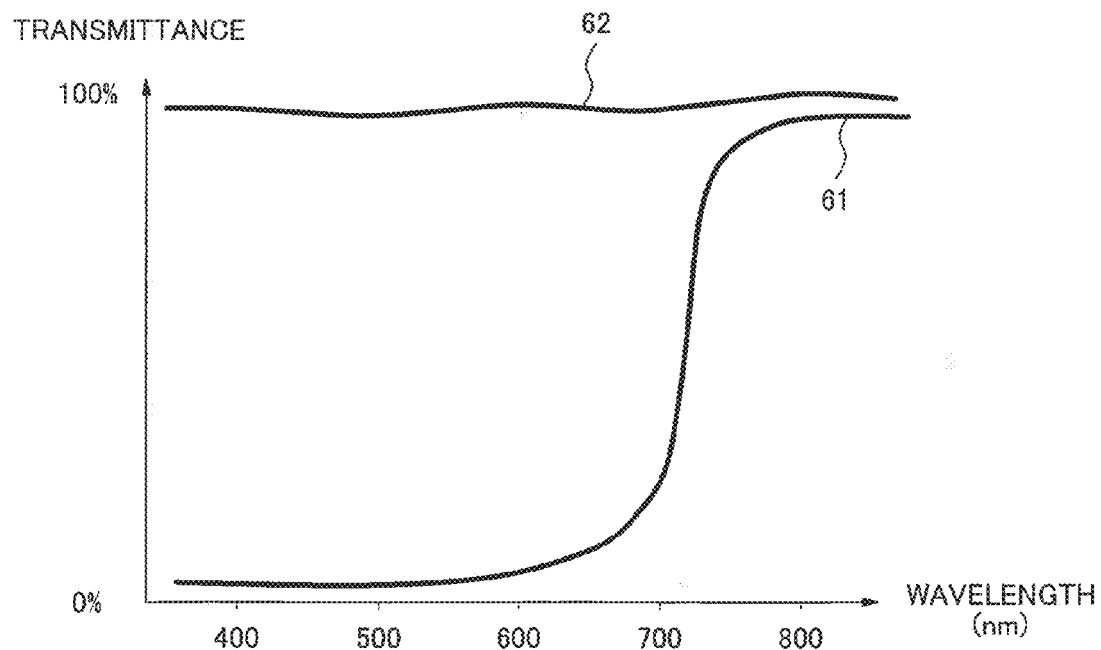
FIG. 23 is one example of spectral transmittances of a coded particular color cut filter in the sixth exemplary embodiment.

FIG. 23 is an example illustrating a spectral transmittance of the particular color cut unit 61 and a spectral transmittance of the particular color transmissive unit 62. The particular color cut unit 61 may cut a whole visible light region as illustrated in the figure as long as a band of wavelength related to a particular color G can be cut. The particular color transmissive unit 62 may pass a whole visible light region as illustrated in the figure as long as a band of wavelength related to a particular color G can be passed.

An incident light to the image capturing device 100C is separated into a light in which a particular color G is cut and a light including a particular color G by the coded particular color cut filter 6. The separated two types of lights are made incident on the photo sensor 3 into which the optical filter 2 is incorporated.

Figure 24:
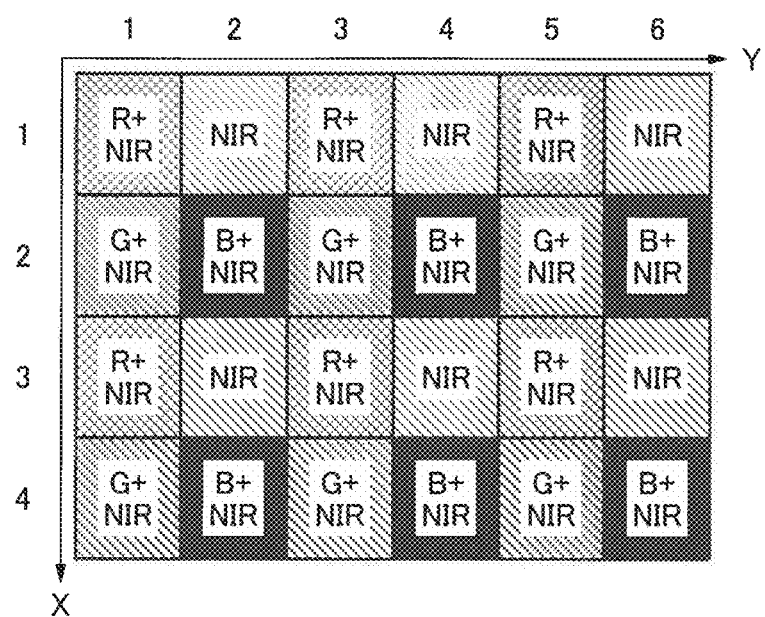
FIG. 24 is an example of RGB image data which a photo sensor in the sixth exemplary embodiment outputs.

FIG. 24 represents a color signal component in each pixel of RGB image data which the photo sensor 3 outputs.

In the present exemplary embodiment, each G filter of a Bayer arrangement of the optical filter 2 includes a partner G filter. The particular color cut unit 61 of the coded particular color cut filter 6 is arranged corresponding to one of a pair of G filters included in the optical filter 2.

Therefore, by a light which passes the particular color cut unit 61 of the coded particular color cut filter 6 and one G filter of the optical filter 2, G component is cut, and an NIR signal is generated.

Figure 1:
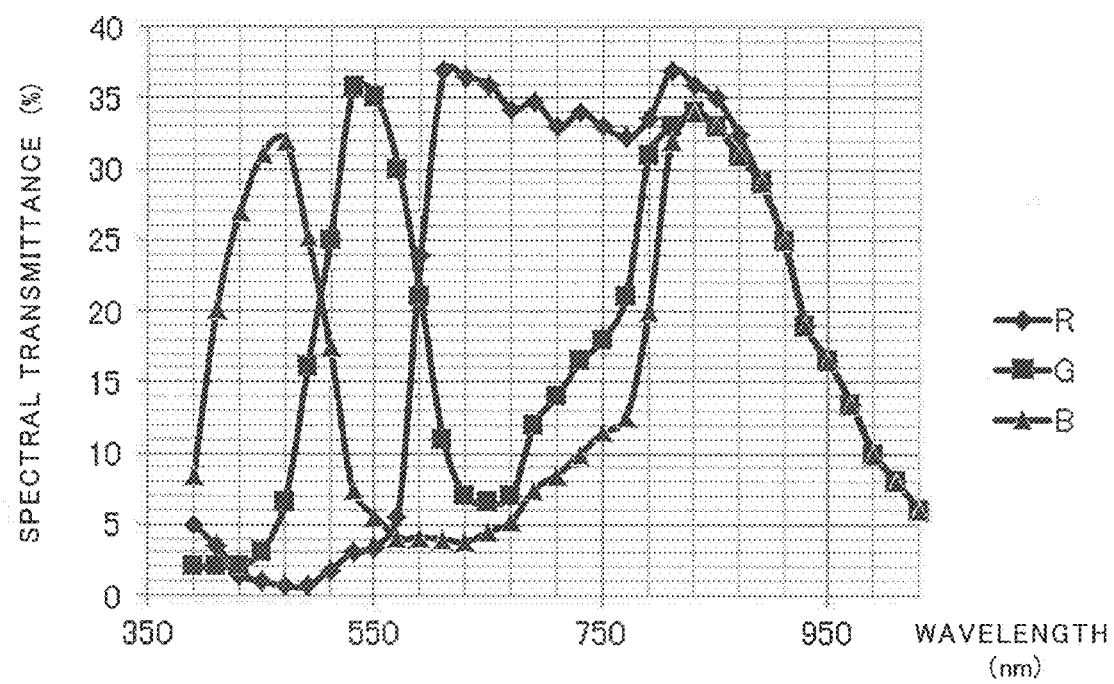
FIG. 1 is an example illustrating spectral transmittances of an RGB three-color optical filter.
Figure 2:
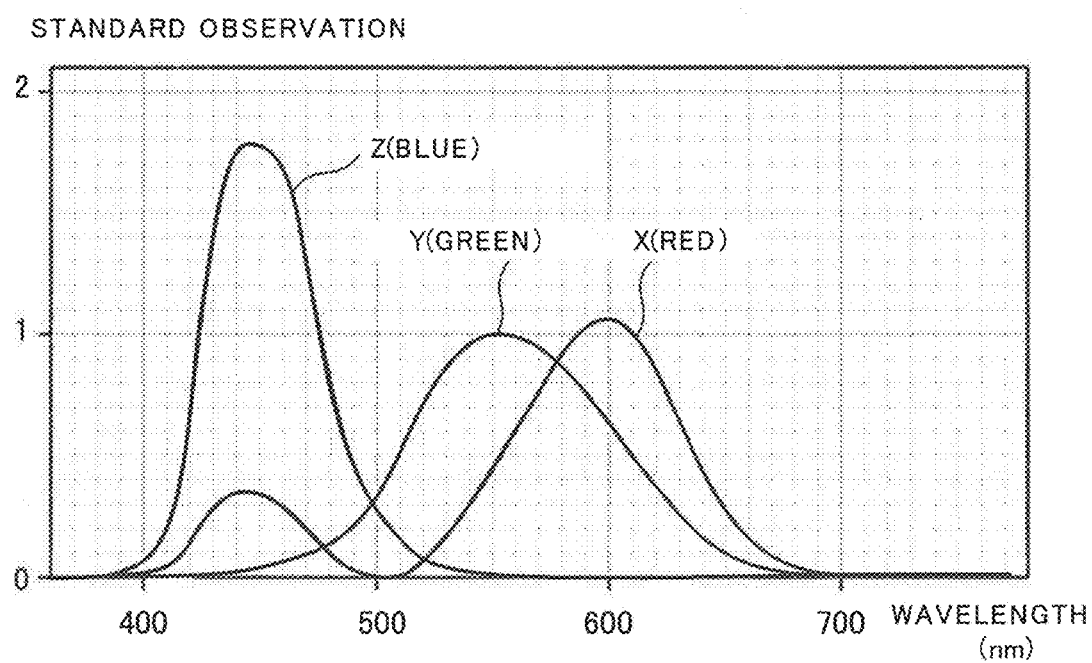
FIG. 2 is color-matching functions of the XYZ color system for color perception of human beings.
Figure 3:
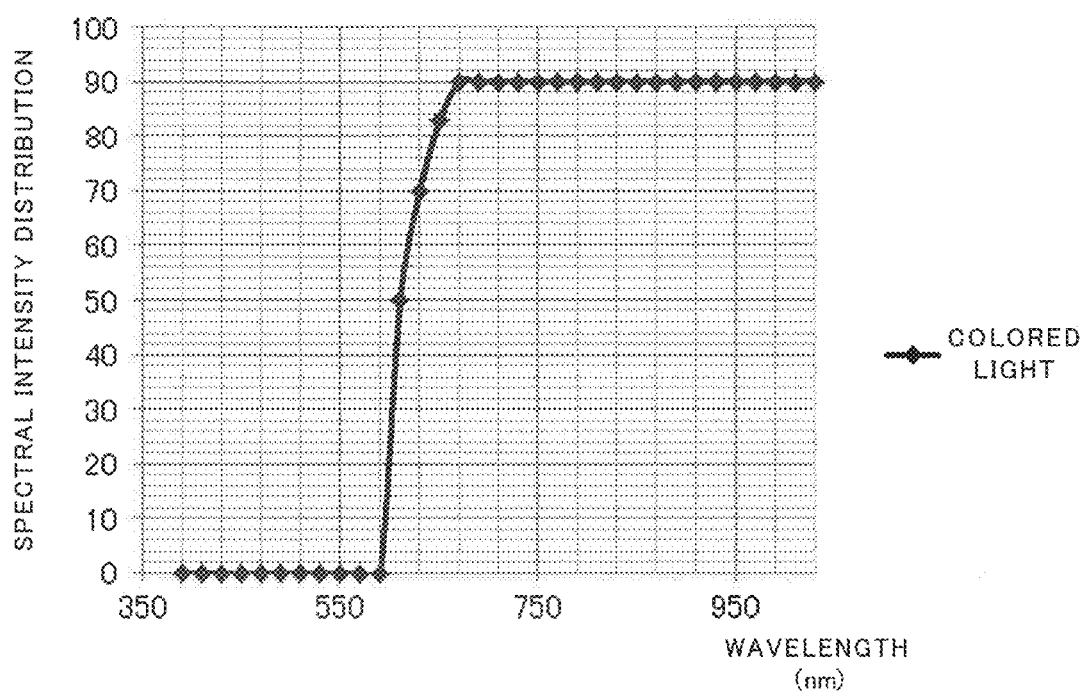
FIG. 3 is a spectral intensity distribution of a colored light which is illustrated as a reference.

On the other hand, the spectral characteristics of the optical filter 2 are similar to FIG. 1. In other words, the spectral characteristics include a component of a near infrared light. As a result, by a light which passes the particular color transmissive unit 62 of the coded particular color cut filter 6 and another G filter, an R filter, and a B filter of the optical filter 2, an R+NIR signal, a G+NIR signal, and a B+NIR signal are generated.

The photo sensor 3 outputs image data of RGB three channels, and a G signal includes a G+NIR signal including a near infrared light and an NIR signal including only a near infrared light. An R signal is an R+NIR signal including a near infrared light, and a B signal is a B+NIR signal including a near infrared light.

In other words, while in the first exemplary embodiment, the image processing unit 4 acquires image data (R, G, B, NIR) for all pixels from image data (see FIG. 10) composed of four color signals for R, G, B, G+NIR, in the sixth exemplary embodiment, the image processing unit 4C acquires image data (R, G, B, NIR) for all pixels from image data (see FIG. 24) composed of four color signals for R+NIR, G+NIR, B+NIR, and NIR.

The image capturing device 100C of the present exemplary embodiment also utilizes the optical filter 2 and the photo sensor 3 which are a configuration similar to a related art, and can obtain a similar effect to that of the first exemplary embodiment.

Seventh Exemplary Embodiment

Configuration

Figure 25:
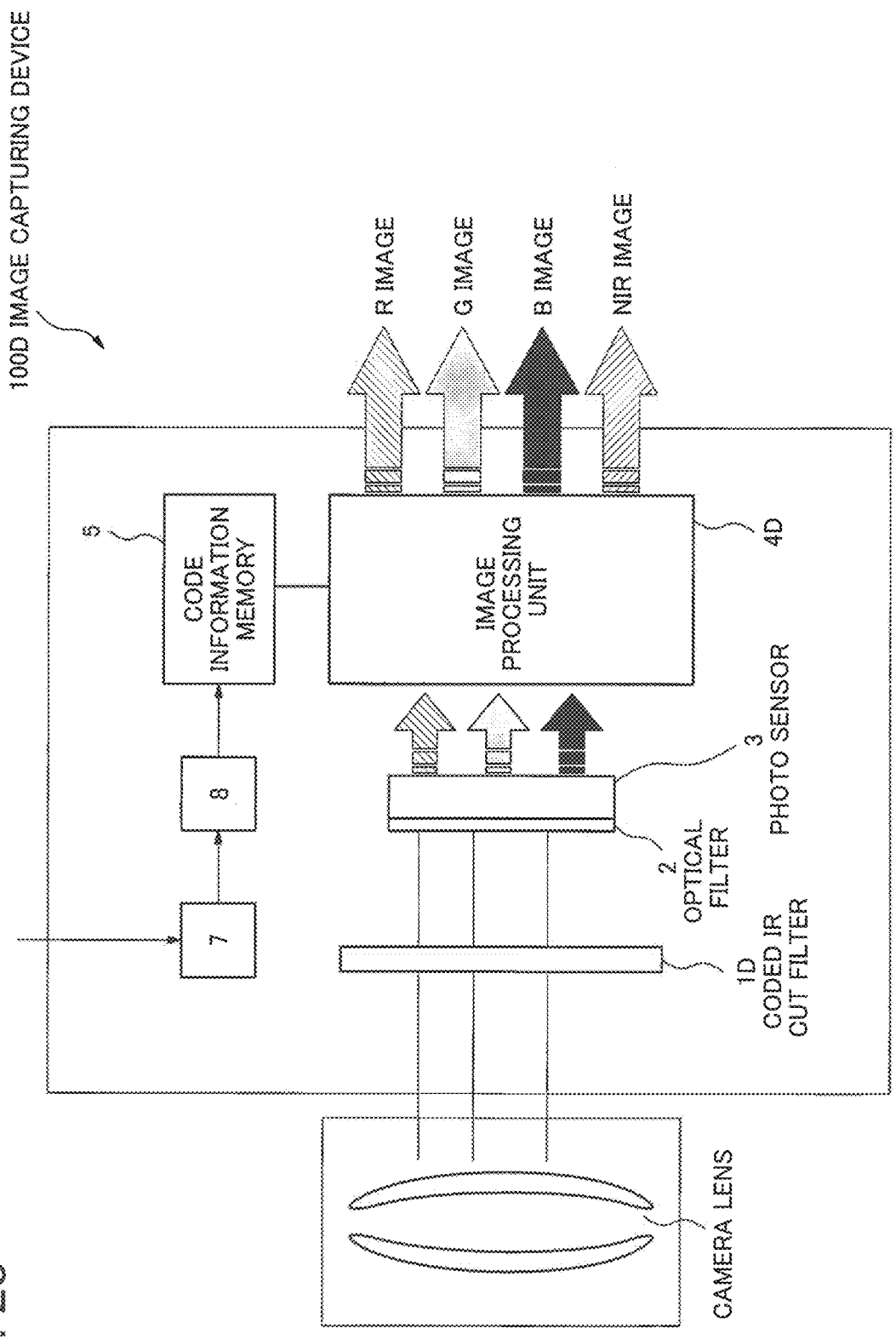
FIG. 25 is a schematic diagram of an image capturing device in a seventh exemplary embodiment.

FIG. 25 is a schematic diagram of an image capturing device 100D in another exemplary embodiment.

The image capturing device 100D includes a coded IR cut filter 1D, the optical filter 2, the photo sensor 3, an image processing unit 4D, the code information memory 5, a position shift information acquisition unit 7, and a code information correction unit 8. For the optical filter 2 and the photo sensor 3, an optical filter and a photo sensor which are used in a general image capturing device are used in a similar manner to the first exemplary embodiment.

Figure 26:
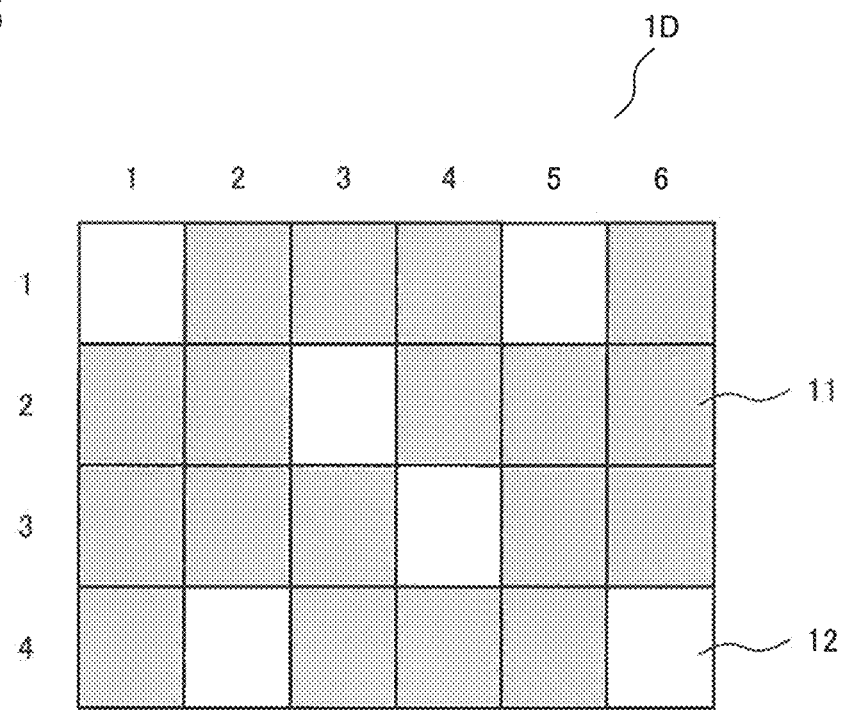
FIG. 26 is an outline of a coded IR cut filter in the seventh exemplary embodiment.

FIG. 26 is an outline of the coded IR cut filter 1D. In the first exemplary embodiment, the infrared transmissive unit 12 of the coded IR cut filter 1 is arranged corresponding to one of a pair of G filters included in the optical filter 2 for each pair of Bayer arrangements. On the other hand, in the seventh exemplary embodiment, 2×2 arrangement (4×4 pixels) Bayer arrangement is set as a basic unit (described below). The infrared transmissive unit 12 of the coded IR cut filter 1D which is composed of 4 pixels is present per each row of the basic unit, is present per each column of the basic unit, and is arranged without duplication. The infrared transmissive unit 12 corresponds to one R, one B, and two Gs in the optical filter 2. Such a coded IR cut filter pattern is designated as pattern 1.

The code information memory 5 stores information related to the infrared transmissive unit 12 in the basic unit. The position shift information acquisition unit 7 acquires position shift information of the coded IR cut filter 1D and the optical filter 2. The code information correction unit 8 corrects information related to the infrared transmissive unit 12 of the code information memory 5 based on the position shift information. The detail thereof will be described below.

[Image Capturing Operation]

Next, an image capturing operation of the image capturing device 100D will be described. An incident light to the image capturing device 100D is separated into a light in which a near infrared light is cut and a light including a near infrared light by the coded IR cut filter 1D. The separated two types of lights are made incident on the photo sensor 3 into which the optical filter 2 is incorporated.

Figure 27:
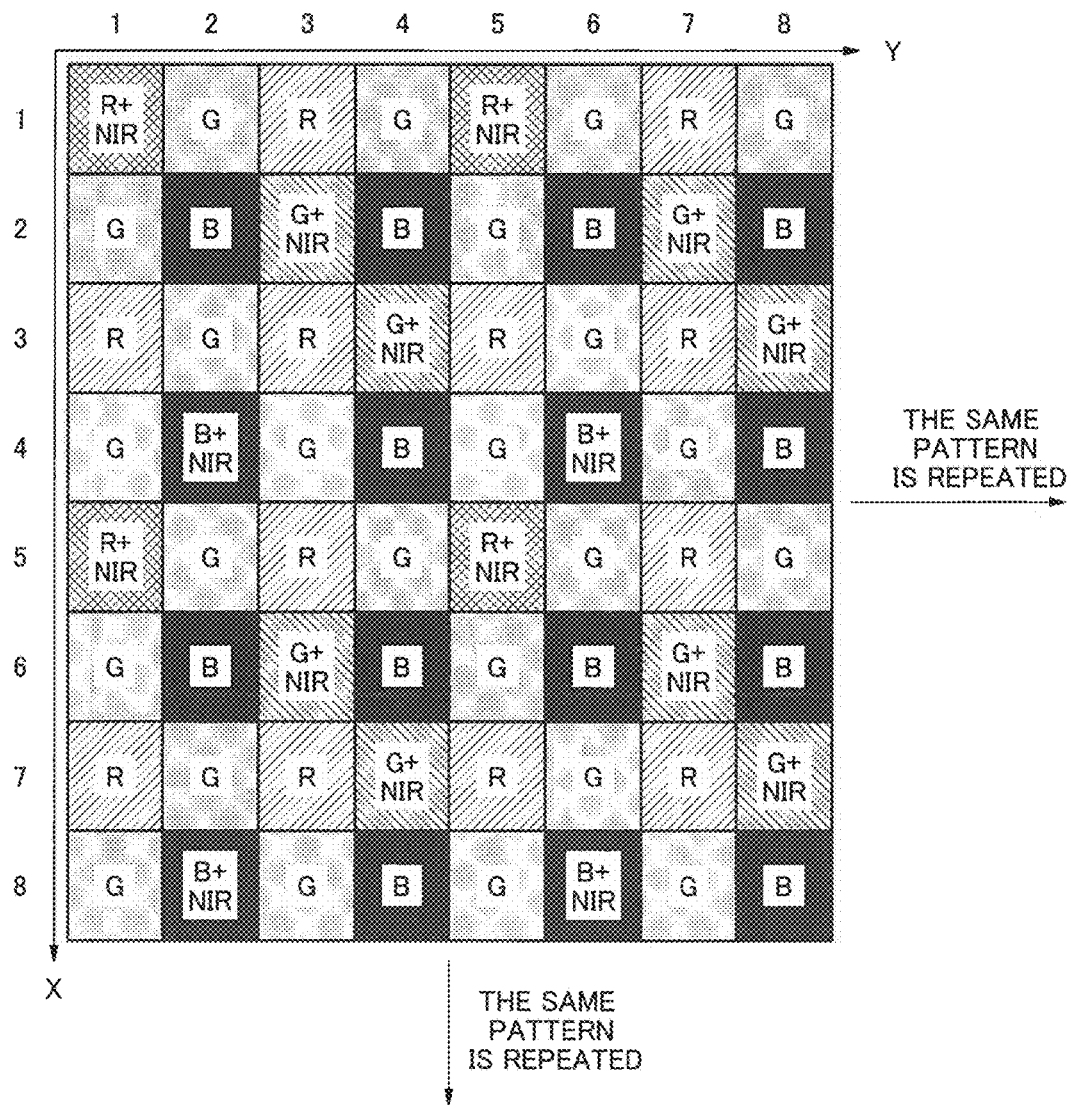
FIG. 27 is an example of RGB image data which a photo sensor in the seventh exemplary embodiment outputs.

FIG. 27 represents a color signal component in each pixel of RGB image data which the photo sensor 3 outputs. There are a pixel in which NIR is added to R, G, and B signals, and R, G, and B signals in which NIR is cut.

The image processing unit 4D generates image data composed of four color signals for R, G, B, and NIR based on image data composed of three color signals R, G, and B. The position of a pixel in which NIR is added to R, G, and B signals is determined based on information from the code information memory 5.

For example, a pixel value of a coordinate value (1,1), a coordinate value (1,5), a coordinate value (5,1), and a coordinate value (5,5) is an output value in which a near infrared region (NIR) light is added to an R (red) wavelength region light. A pixel value of a coordinate value (2,3), a coordinate value (3,4), a coordinate value (6,3), a coordinate value (7,4), a coordinate value (2,7), a coordinate value (3,8), a coordinate value (6,7), a coordinate value (7,8) is addition value of G (green) and NIR. A pixel value of a coordinate value (4,2), a coordinate value (4,6), a coordinate value (8,2), a coordinate value (8,6) is addition value of B (blue) and NIR.

Assuming the spectral transmittance of the optical filter 2 have comparable level of transmittance characteristic in a near infrared region of 700 nm or longer, and when the same quantity of a near infrared light are made incident, the amounts of signals of NIR in R, G, and B are regarded to be the same.

The image processing unit 4D applies demosaicing processing for RGB three channels image data including NIR which is output by the photo sensor 3 into which the RGB three color optical filter 2 is incorporated to generate four channels image data for R, G, B, NIR.

A method of generating four channels image data will be described. First, the image processing unit 4D calculates pure color information (R, G, B) not including NIR for a pixel including NIR component in image data. 4×4 pixels pattern (basic unit) is repeated.

Here, the coordinate value (5,5) is focused on. Pure R information not including NIR for R(5,5)+NIR(5,5) is calculated from a pixel having information of pure R present in its neighborhood. A method using Gradient Based Interpolation described in NPL 3 will be described, and a variety of pixel interpolation methods can be applied. Pure R information not including NIR for R+NIR(5,5) of the coordinate value (5,5) is calculated from pixels (R(3,3), R(3,5), R(3,7), R(5,3), R(5,7), R(7,3), R(7,5), R(7,7)) having information of pure R present in the neighborhood of the coordinate value (5,5). The calculation procedure thereof is illustrated below.

$$GD1=(R(5,3)+R(5,7))/2-(R(5,5)+NIR(5,5))$$

$$GD2=(R(3,3)+R(7,7))/2-(R(5,5)+NIR(5,5))$$

$$GD3=(R(3,5)+R(7,5))/2-(R(5,5)+NIR(5,5))$$

$$GD4=(R(7,3)+R(3,7))/2-(R(5,5)+NIR(5,5))$$

GD is an evaluation value (in terms of absolute value) which takes Gradient (inclination of pixel values) into consideration. The inclination of a pixel value is evaluated for four directions, a vertical direction, a horizontal direction, a right diagonal direction, and a left diagonal direction. That GD is a minimum value suggests that a pixel value has continuity.

For example, when GD1 is the minimum, the image processing unit 4D determines that $$R(5,5)=(R(5,3)+R(5,7))/2.$$

A case in which the minimum value is GD2, GD3, or GD4 is similar to the above.

For a pixel of G or B including NIR, the image processing unit 4D calculates information of pure G or B not including NIR from eight pixels having information of pure G or B present in its neighborhood in a similar manner to the above.

Since arrangement pattern of a pixel of G including NIR is different from that of R and B, GD2 and GD4 representing evaluation of the inclination of a pixel value in a diagonal direction may be calculated in an irregular manner. Now, one example of a calculate method of GD2 and GD4 for R(3,4)+NIR(3,4) in the coordinate value (3,4) will be described.

$$GD2=(G(1,2)+G(1,2)+G(4,5)+G(5,6))/4-(G(3,4)+IR(3,4))$$

$$GD4=(G(5,2)+G(4,3)+G(2,5)+G(1,6))/4-(G(3,4)+IR(3,4))$$

The image processing unit 4D then selects the minimum value by determining the magnitude of GD1 to GD4.

However, a pixel including NIR located at a position near the circumference of the sensor such as a coordinate value (1,1), a coordinate value (2,3), or a coordinate value (4,2) can not acquire eight pixels from its neighborhood around the pixel. In such a case, an exceptional processing may be performed by calculating from a value of an adjacent pixel having the same color not including NIR.

For example, in a case of a coordinate value (1,1), the exceptional processing is performed by using:

$$R(1,1)=(R(1,3)+R(3,1)+R(3,3))/3, \text{ or}$$

$$R(1,1)=(R(1,3)+R(3,1))/2.$$

In a case of a coordinate value (2,3), the image processing unit 4D may perform interpolation calculation:

$$G(2,3)=((G(1,2)+G(1,4)+G(3,2))/3.$$

For a diagonal component, a weighting coefficient may be introduced to suppress a contribution in the interpolation calculation.

By the above-described processing, pure RGB image data not including NIR information is obtained from RGB image data (FIG. 27) including NIR information. Here, RGB image data including NIR information is referred to as "RGB+NIR image data", pure RGB image data not including NIR information is referred to as "RGB image data".

Further, the image processing unit 4D generates NIR image data only including NIR information from RGB+NIR image data and RGB image data. Specifically, the data is determined by NIR image data=(RGB+NIR image data)−RGB image data.

Figure 28:
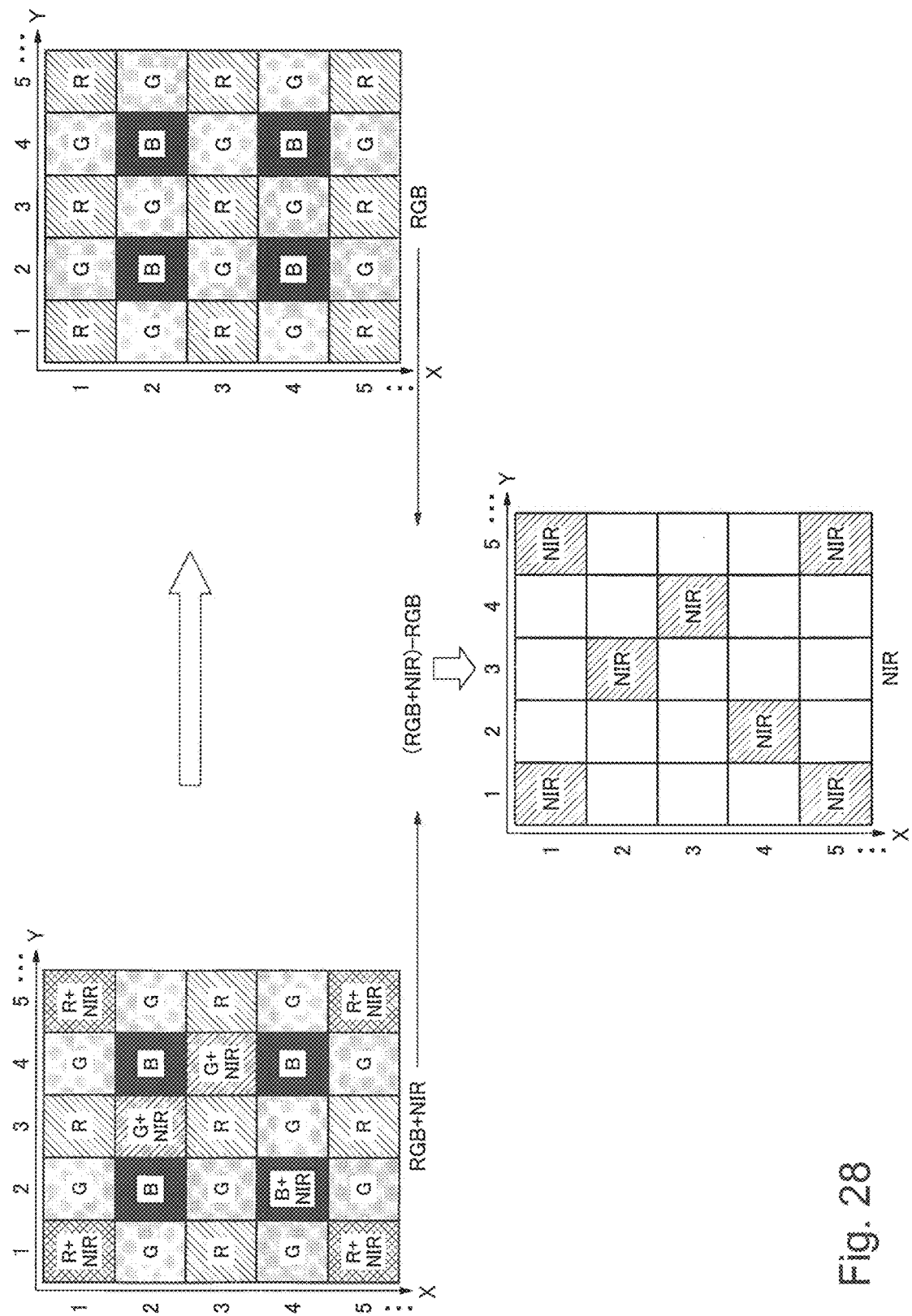
FIG. 28 is a conceptual diagram of NIR image data acquisition in the seventh exemplary embodiment.

FIG. 28 is a conceptual diagram of NIR image data acquisition.

Next, the image processing unit 4D applies demosaicing processing to RGB image data and NIR image data, and calculates absent color information (R, G, B, NIR) for all pixels of the image data.

First, a variety of demosaicing processings (pixel interpolation methods) illustrated in NPL 3, NPL 4, and NPL 5 can be applied to RGB image data in a Bayer type arrangement. All RGB color information is thus determined for all pixels in RGB image data.

On the other hand, demosaicing processing of NIR image data is performed in the following manner.

Figure 29:
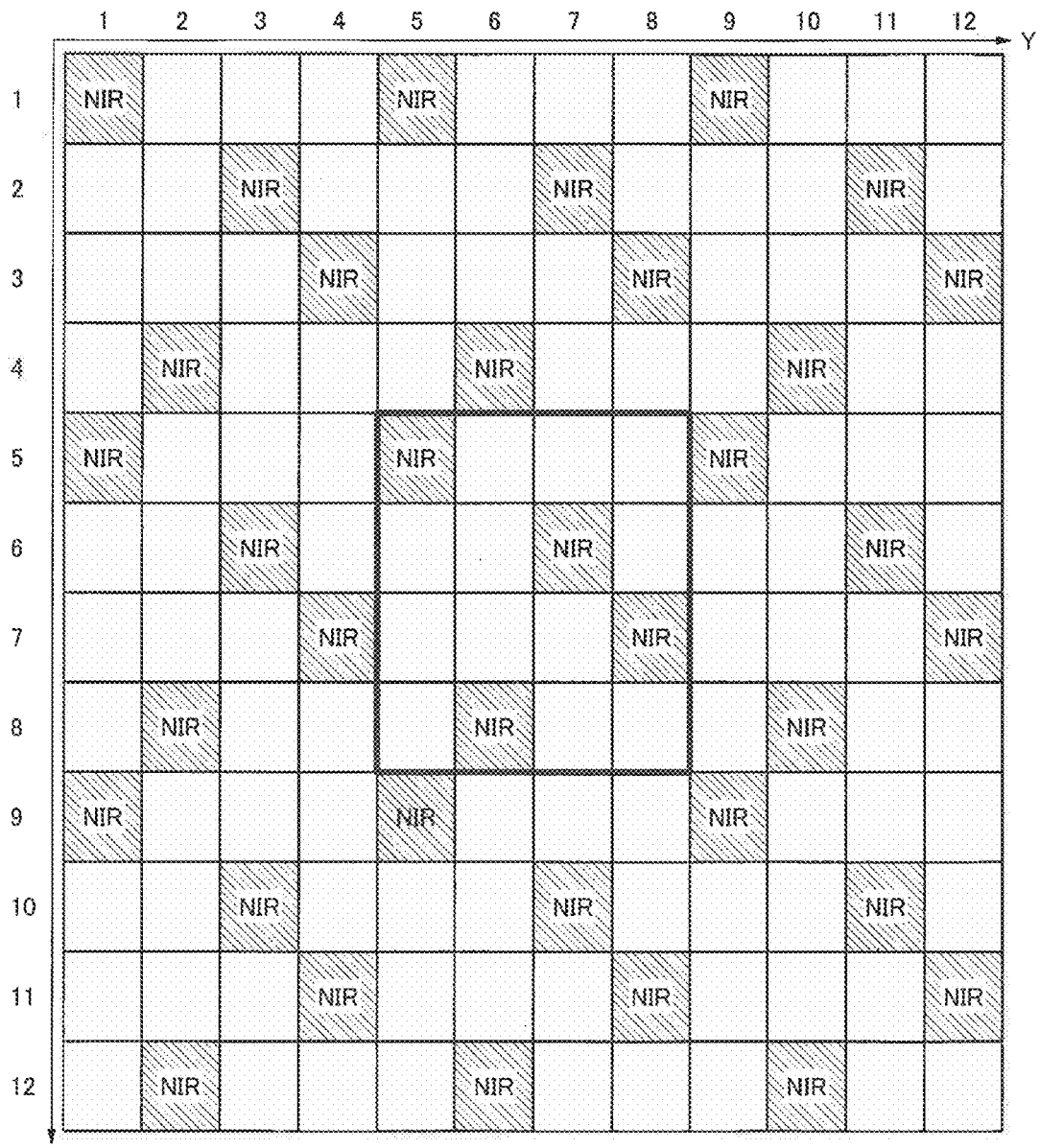
FIG. 29 is an enlarged version of NIR image data in the seventh exemplary embodiment.

FIG. 29 is an enlarged version of NIR image data illustrated in FIG. 28. NIR image data is repetition of 4 pixels×4 pixels pattern from a coordinate value (1,1) to coordinate value (4,4) as one unit. Now, a method of calculating NIR of pixel not including NIR for one unit (unit surrounded by a thick-line frame) from a coordinate value (5,5) to a coordinate value (8,8) will be described. Here, the unit surrounded by a thick-line frame is referred to as "basic unit".

Figure 30:
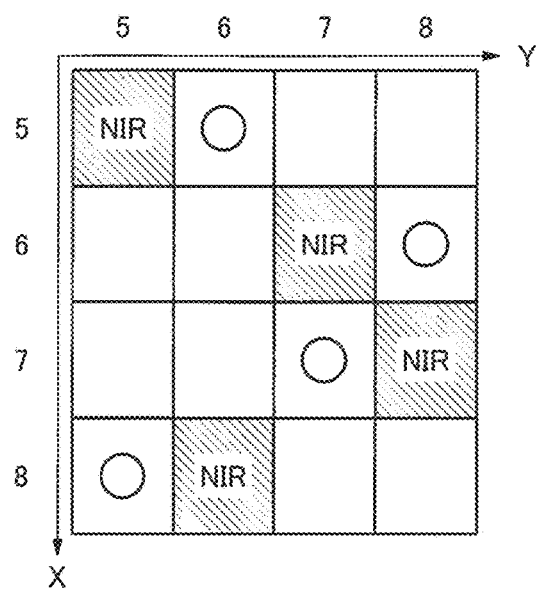
FIG. 30 is a basic unit extracted from NIR image data in the seventh exemplary embodiment.

FIG. 30 is a diagram illustrating a basic unit extracted from NIR image data. With respect to a pixel not including NIR in the basic unit, the image processing unit 4D first finds a pixel which has three or more pixels including NIR information out of eight pixels adjacent to the pixel. The image processing unit 4D calculates NIR in the pixel by using pixel interpolation.

In FIG. 30, to a pixel which has three or more pixels including NIR information out of eight pixels adjacent to the pixel in the basic unit, a circle sign (○ sign) is added. With respect to four pixels of coordinate values (5,6), (6,8), (7,7), and (8,5) which are designated as ○ sign, the image processing unit 4D calculated NIR by using an interpolation method from adjacent pixels including NIR information. For example, the image processing unit 4D can calculate NIR in the pixel of the coordinate value (7,7) by the following pixel interpolation method from three NIRs of coordinate values (6,7), (7,8), and (8,6).

NIR(7,7)=(NIR(6,7)+NIR(7,8)+NIR(8,6))/3

The same applies to the remaining three pixels (5,6), (6,8), and (8,5). A method other than this pixel interpolation method can be applied.

NIR information is thus obtained by four pixels acquired in FIG. 29 and four pixels to which ○ sign is added in FIG. 30 in the basic unit (4×4). Further, NIR information in the remaining eight pixels to which NIR information is not provided or in coordinate values (5,7), (5,8), (6,5), (6,6), (7,5), (7,6), (8,7), (8,8) is calculated.

By the addition of ○ sign in FIG. 30, also with respect to the remaining eight pixels, among eight adjacent pixels, there are three or more pixels to which NIR information is provided. Therefore, NIR information can be calculated for the remaining eight pixels by the pixel interpolation method using a pixel having NIR information. NIR information can thus be calculated for all pixels in the basic unit.

As mentioned above, by applying the above-described processing which calculates RGB and NIR to image data of FIG. 27, image data in which R, G, B, or NIR is provided to all pixels can be generated.

Further, the image processing unit 4D mainly utilizes R, G, B information to perform image processing of a visible light region, and mainly utilizes NIR information to perform image processing of a near infrared region.

[Position Shift Correction Operation]

In one exemplary embodiment of the present invention, the coded IR cut filter 1 is arranged on a general image capturing device. However, a position shift between the coded IR cut filter 1 and the optical filter 2 may occur when they are arranged.

Figure 31:
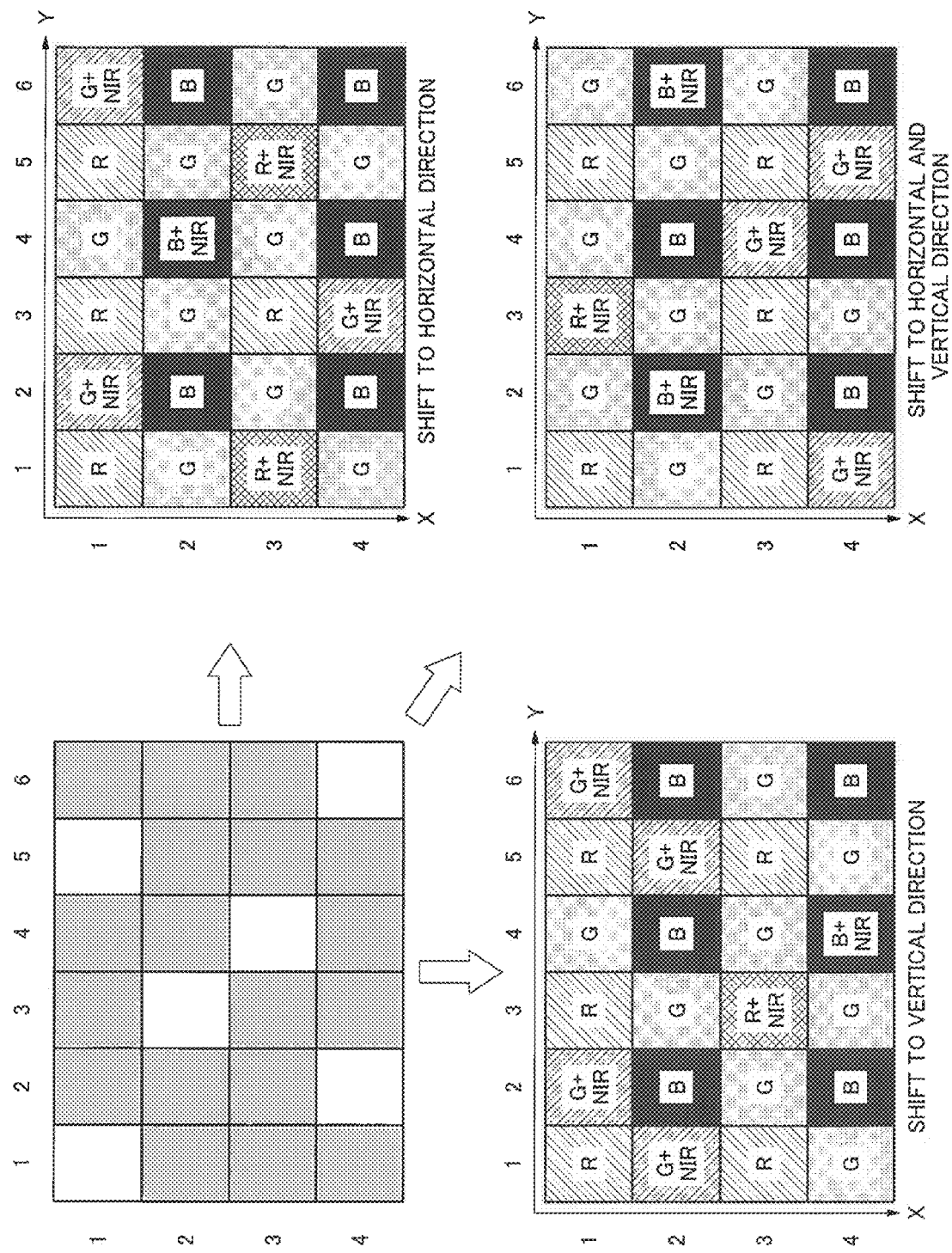
FIG. 31 is an example of RGB image data when one pixel position shift is occurred in each of the X (horizontal) direction, the Y (vertical) direction, and the diagonal direction in the seventh exemplary embodiment.

FIG. 31 illustrates a pattern of a color signal component of RGB image data which the photo sensor 3 outputs when one pixel position shift is occurred in each of the X (horizontal) direction, the Y (vertical) direction, and the diagonal direction. A position shift by two pixels needs not be taken into consideration since a pattern which is shifted by two pixels consequently corresponds to the original pattern due to the characteristics of a Bayer arrangement.

In the following, a method of correction based on detected position shift information of a manufactured image capturing device 100D will be described.

By a test irradiation, image capturing with the image capturing device 100D is actually performed. An image capturing scene is not particularly restricted, and a scene in which all pixels are irradiated with a near infrared light may be selected.

First, when the image capturing device 100D performs image capturing (IR cut filter described below OFF), RGB image data including NIR information illustrated in FIG. 31 is obtained.

Figure 4:
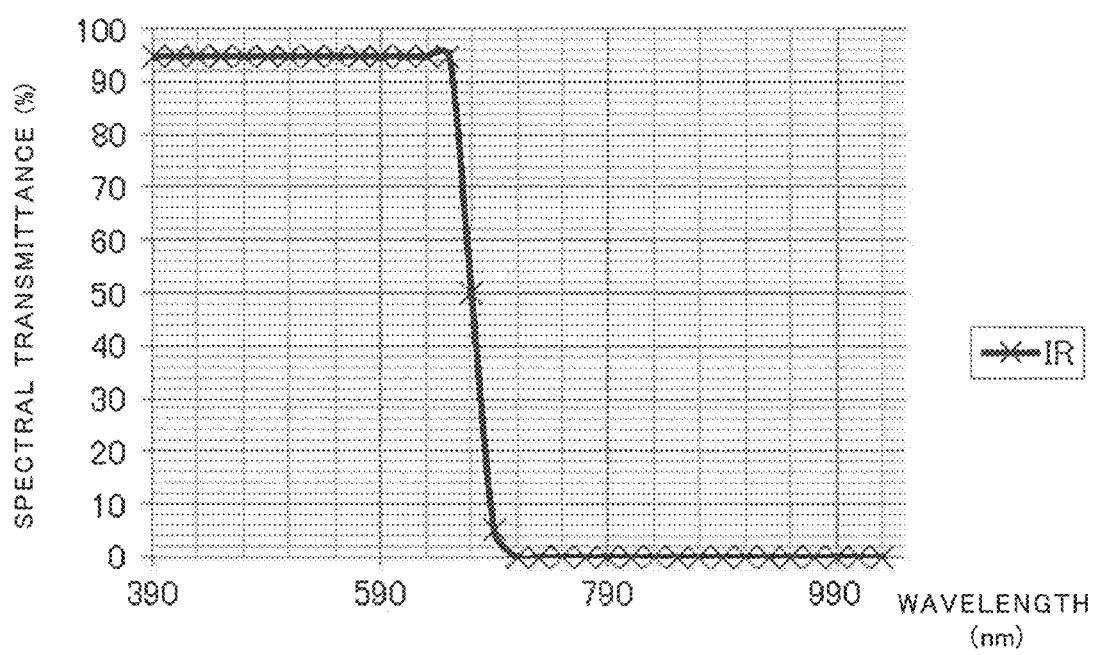
FIG. 4 is one example of a spectral transmittance of an IR cut filter.

When an IR cut filter which cuts off only a light in a near infrared light region illustrated in FIG. 4 is placed to cover a lens and image capturing is performed for the same scene (IR cut filter ON), pure RGB image data not including NIR information is obtained.

In other words, in the test irradiation, image capturing is performed in two states, IR cut filter "ON" and "OFF".

That a subtraction value when RGB image data is subtracted from RGB+NIR image data is larger than a certain threshold value means that a pixel which has the subtraction value includes NIR. NIR image data can thus be acquired (an outline thereof is almost similar to FIG. 28).

Incidentally, the code information memory 5 stores pattern information related to the infrared transmissive unit 12 in a basic unit. By comparing a near infrared radiation pixel pattern obtained by the test irradiation with a pattern of coded IR cut filter 1D, correspondence thereof, or occurrence of a position shift either in the horizontal direction, the vertical direction, or a diagonal direction can be detected.

A position shift information acquisition unit 7 acquires a position shift pattern either in the horizontal direction, the vertical direction, or a diagonal direction, and the code information correction unit 8 corrects information related to the infrared transmissive unit 12 of the code information memory 5 based on a (vertical, horizontal, or diagonal) position shift pattern.

The image processing unit 4D performs image capturing based on corrected pattern information of the coded infrared cut filter.

Advantageous Effects

Although the image capturing device according to the first to sixth exemplary embodiments of the present invention has a simple configuration that the coded IR cut filter 1 is only arranged on a general image capturing device, a position shift may occur between the coded IR cut filter 1 and the optical filter 2 when the filter is arranged.

Correction of a position shift such as rearrangement of the coded IR cut filter 1 takes time and labor.

In contrast, in the present exemplary embodiment, a position shift is corrected not by rearranging the coded IR cut filter 1D but by correcting information of the code information memory 5. As a result, an effect related to convenience of the present invention is increased, and cost of manufacturing can be further reduced.

Problems to be Solved Characteristic of Seventh Exemplary Embodiment

For example, in the first exemplary embodiment which is a basic exemplary embodiment of the present invention, a problem related to a position shift may occur. Specifically, when a relationship between the coded IR cut filter 1 and the optical filter 2 shifts by one pixel, a failure may occur.

Figure 32:
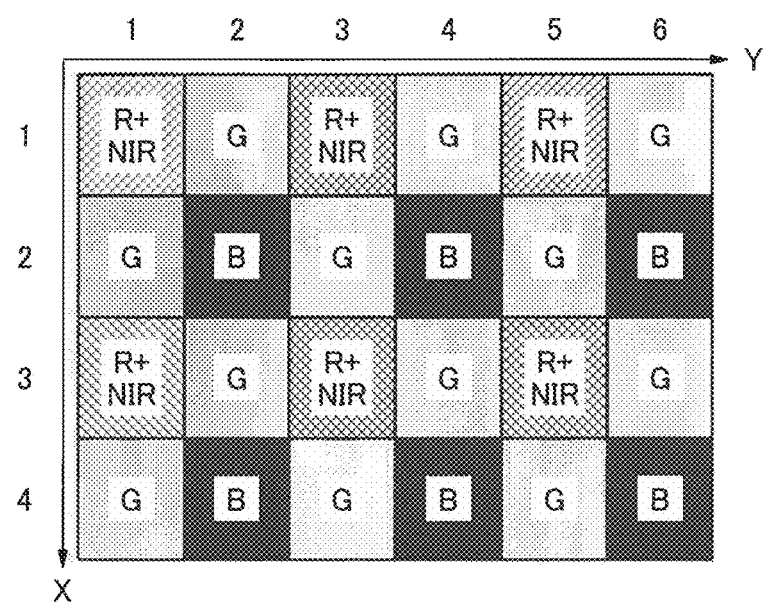
FIG. 32 is an example of RGB image data which explains a problem related to the position shift.

FIG. 32 is an example of RGB image data explaining a problem related to a position shift. For example, when a relationship between the coded IR cut filter 1 and the optical filter 2 shifts one pixel in the horizontal direction, output data is as illustrated in from FIG. 10 (the first exemplary embodiment) to FIG. 32. In other words, photo sensor 3 outputs R+NIR, G, and B signals. In other words, an R signal in which NIR is cut is not output. As a result, an NIR value can not be calculated.

In a similar manner to the above, when the relationship shifts in the vertical direction by one pixel, the photo sensor 3 outputs R, G, and B+NIR signal. In other words, a B signal in which NIR is cut is not output. As a result, an NIR value can not be calculated.

The coded IR cut filter and the image capturing device according to the seventh exemplary embodiment can also solve a problem related to a position shift as described above.

[Coded IR Cut Filter Pattern Modified Examples]

The above-described pattern of the coded IR cut filter 1D is designated as pattern 1 (FIG. 26). As characteristics of the pattern 1, in a basic unit of 4×4 pixels:
(1) that there are four pixels related to the infrared transmissive unit 12, one of which is present in each row and in each column without duplication; and
(2) that pixels related to the infrared transmissive unit 12 correspond to one R, one B, and two Gs
are exemplified.

Figure 33:
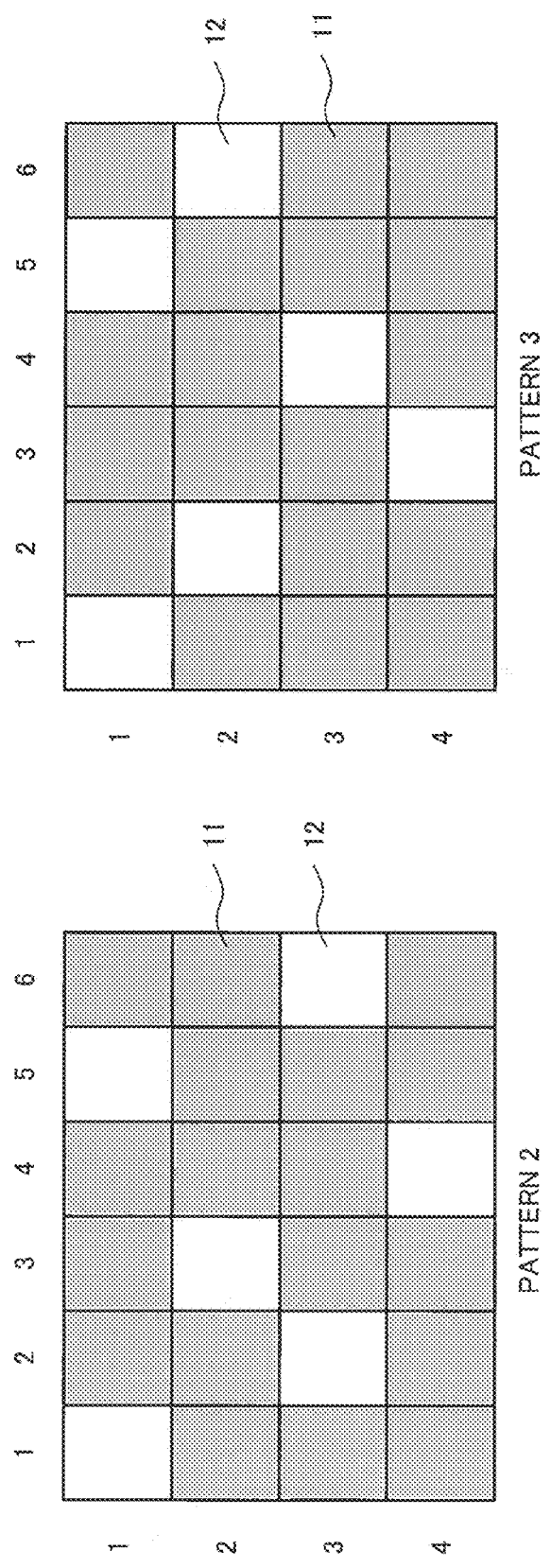
FIG. 33 is pattern modified examples of the coded IR cut filter in the seventh exemplary embodiment.
Figure 34:
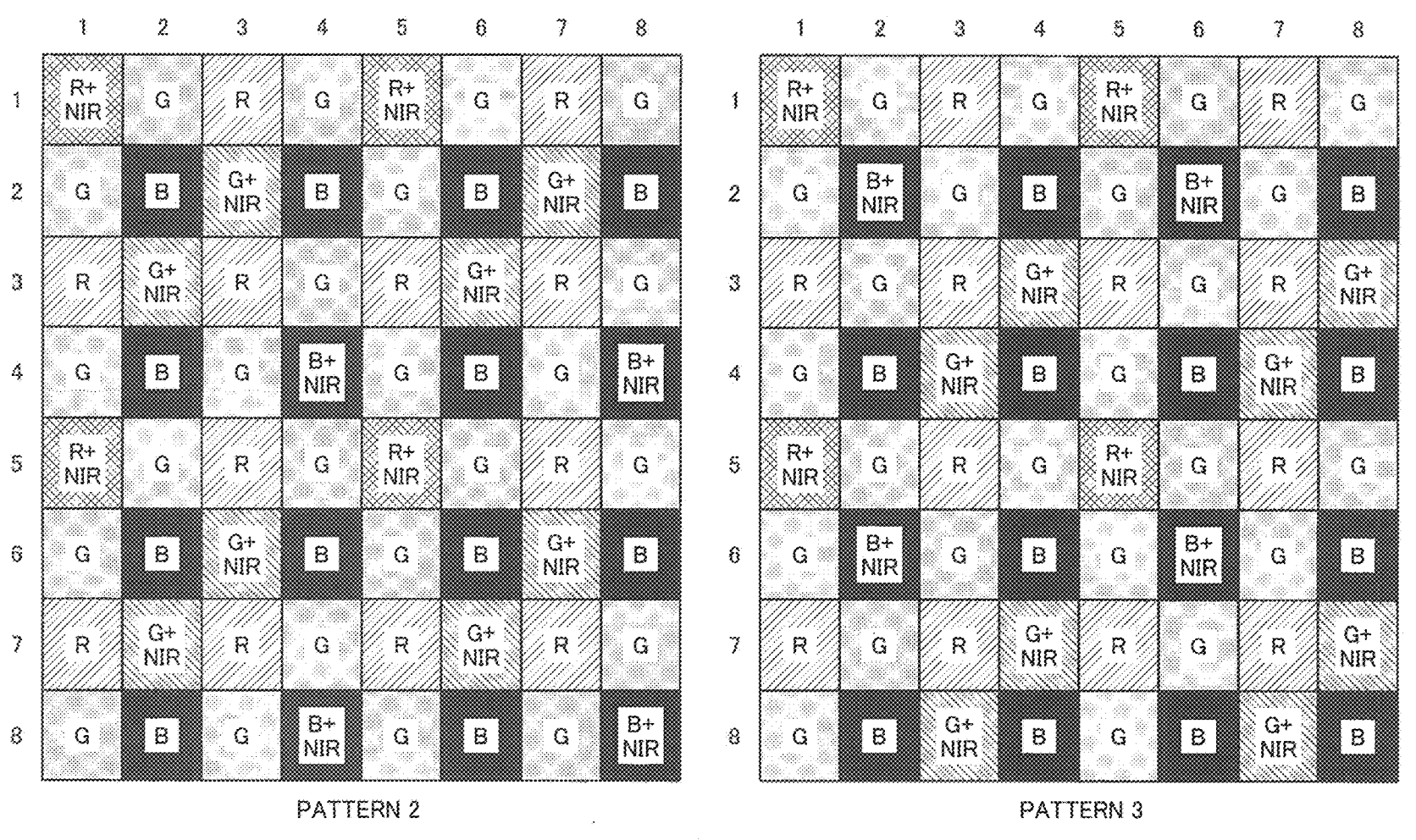

FIG. 33 is pattern modified examples (a pattern 2 and a pattern 3) of the coded IR cut filter 1D. FIG. 34 is output image data corresponding to the pattern 2 and the pattern 3.

The pattern 2 and the pattern 3 fulfill the above-described two characteristics. By this, in a manner similar to the pattern 1, a position shift can be easily corrected. Data processing related to image capturing is also similar to that of the pattern 1.

Further, a position shift can also be corrected by using a pattern other than the patterns 1 to 3 of the coded IR cut filter 1D. For example, in the coded IR cut filter 1B (FIG. 17), 4×4 pixels (2 arrangement×2 arrangement) may be set to a basic unit. A basic unit is not limited to 4×4 pixels (2 arrangement×2 arrangement). For example, 4×2 pixels (2 arrangement×1 arrangement) may be employed.

When a basic unit is composed of sites corresponding to adjacent N (N is an integer) sets of Bayer arrangements, N or more infrared transmissive units 12 are preferably in the basic unit.

At this time, the position of an infrared transmissive unit at a site corresponding to one Bayer arrangement and the position of an infrared transmissive unit at a site corresponding to another Bayer arrangement are different from each other by one or more. In other words, when all the positions of the infrared transmissive unit are the same with respect to N sets of Bayer arrangement corresponding sites, such an arrangement is excluded.

Description will be made by taking FIG. 9 as an example. When a basic unit is composed of sites corresponding to four sets (2×2) of Bayer arrangement, there are four infrared transmissive units 12. However, the infrared transmissive unit 12 is at the same position G of each Bayer arrangement corresponding site, which does not fulfill the above-described condition.

Eighth Exemplary Embodiment

Figure 35:
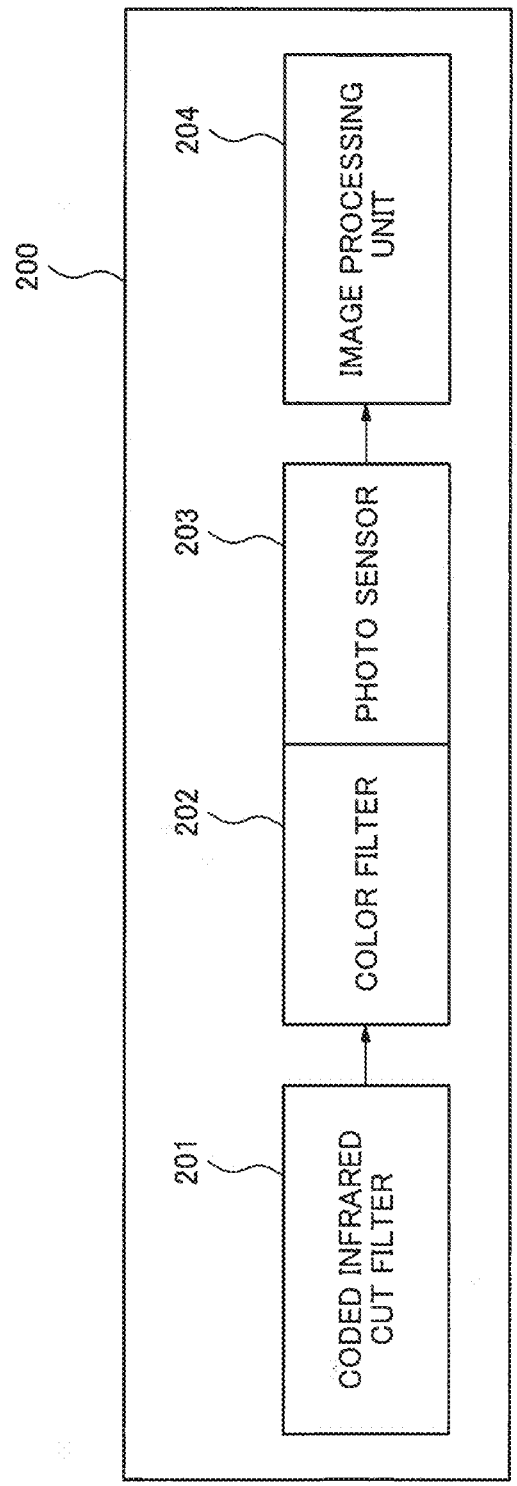
FIG. 35 is a schematic diagram of an image capturing device of an eighth exemplary embodiment.

An eighth exemplary embodiment including the above-described exemplary embodiment will be described with reference to FIG. 35. An image capturing device 200 of the eighth exemplary embodiment includes a coded infrared cut filter 201, a color filter 202, a photo sensor 203, and an image processing unit 204.

The color filter 202 separates an incident light into a plurality of colors. The photo sensor 203 converts the plurality of colors which the color filter has separated into data representing image signals. The coded infrared cut filter 201 is provided in front of the color filter in the light traveling direction or provided between the color filter and the photo sensor, and includes an infrared cut unit which cuts a near infrared light and an infrared transmissive unit which passes the near infrared light. The image processing unit 204 acquires plural-color information and near infrared information of a pixel based on a plurality of image signals related to lights which pass the infrared cut unit of a pixel and adjacent pixels and an image signal related to a light which passes the infrared transmissive unit.

By employing the above-described configuration, according to the present eighth exemplary embodiment, an effect that image processing of a visible light region and a near infrared region can be performed by, while utilizing a configuration of a general image capturing device, only adding a simple configuration thereto is obtained.

Figure 36:
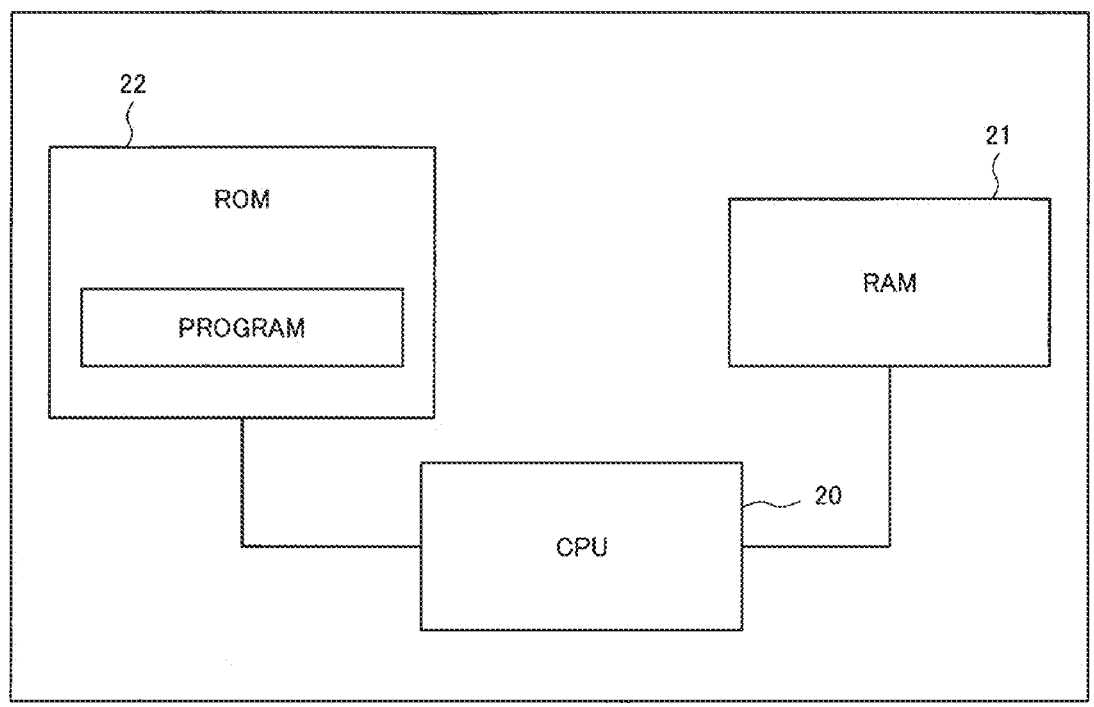
FIG. 36 is a diagram illustrating one example of a hardware configuration attaining the image capturing device in each of the above-described exemplary embodiments.

The image processing unit, the code information memory, the position shift information acquisition unit, and the code information correction unit of the image capturing device illustrated in each drawing are attained by a hardware resource illustrated in FIG. 36. In other words, a configuration illustrated in FIG. 36 includes a CPU (Central Processing Unit) 20, a RAM (Random Access Memory) 21, and a ROM (Read Only Memory) 22. A CPU20 controls overall operation of the image capturing device by reading a variety of software programs (computer programs) stored in the ROM22 to RAM21 and executing the programs. In other words, in each of the above-described exemplary embodiments, the CPU20 executes a software program which executes each function (each unit) which the image capturing device includes with reference to the ROM22 as appropriate.

(Others)

The present invention has been hereinabove explained using preferred embodiments, but the present invention is not necessarily limited to the above embodiments, and can be modified and carried out in various manners within the scope of the technical concept.

For example, while in the above-described exemplary embodiment, an example of RGB has been described as a color system of image data, also in cases in which CMY which is a complementary color system is used, a similar calculation method can be applied.

Although, in general, a Bayer arrangement refers to an arrangement which includes an RGB three color 2×2 pixels arrangement as a minimum unit and in which the minimum unit arrangement is arranged in order, CMY which is a complementary color system may also be used. Further, a Bayer arrangement may be interpreted widely as another plural-color arrangement.

(Supplement)

Figure 5:
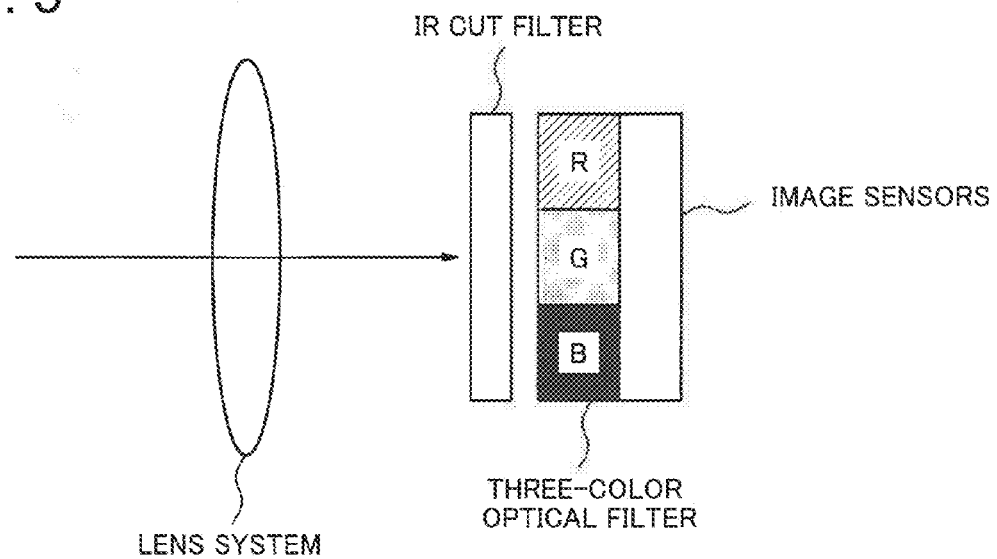
FIG. 5 is a schematic configuration of an optical system of a color image input device.
Figure 6:
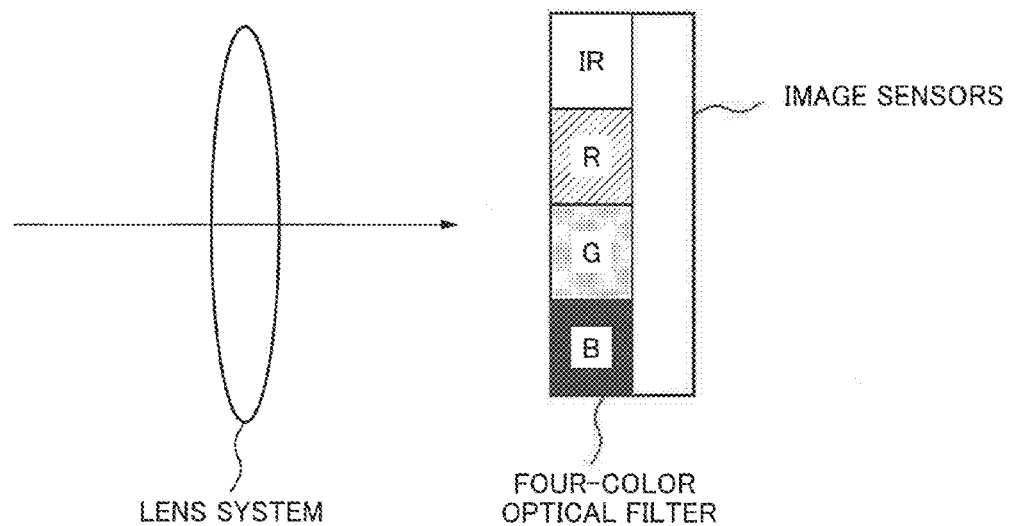
FIG. 6 is a schematic configuration of an image capturing device utilizing a four-color optical filter.

A general image capturing device has a basic configuration comprising a near infrared cut filter, an optical filter, and a photo sensor (see FIG. 5). A near infrared light is removed by a near infrared cut filter. On the other hand, although a photo sensor inherently has the sensitivity as far as a near infrared region, the capability of the photo sensor has not been taken advantage of.

The present inventor focuses on the sensitivity in a near infrared region of a photo sensor which has not been effectively utilized. Further, the present inventor has examined image processing of a visible light region and a near infrared region while utilizing a configuration of a general image capturing device.

The present inventor has studied the above, thereby completing the present invention.

This application is based upon and claims the benefit of priority from Japanese Patent Application No. 2013-220507 filed on Oct. 23, 2013, the entire disclosure of which is incorporated herein.

INDUSTRIAL APPLICABILITY

The present invention can be applied to an image capturing device such as a digital camera or a video camera.

REFERENCE SIGNS LIST 1, 1A to D coded infrared cut filter
2 optical filter
3 photo sensor
4 image processing unit
5 code information memory
6 coded particular color cut filter
7 position shift information acquisition unit
8 code information correction unit
11 infrared cut unit
12 infrared transmissive unit
21 prism
31 to 36 sensor
41, 42 image processing unit
61 particular color cut unit
62 particular color transmissive unit
100, 100A-D image capturing device
101 image capturing device (three-plate type)
102 image capturing device (layered sensor type)

What is claimed is:

1. An image capturing device comprising:
a color filter which separates an incident light into a plurality of colors;
a photo sensor which converts the plurality of colors which the color filter has separated into data representing image signals;
a coded infrared cut filter which is provided in front of the color filter in the light traveling direction or between the color filter and the photo sensor, and which cuts a near infrared light and passes the near infrared light; and
a hardware image processor which acquires plural-color information and near infrared information of a pixel based on a plurality of image signals related to lights which pass a cutting portion of the coded infrared cut filter and an image signal related to a light which passes a transmitting portion of the filter.

2. The image capturing device according to claim 1, wherein
the coded infrared cut filter is provided in front of the color filter in the light traveling direction.

3. The image capturing device according to claim 1, wherein
the hardware image processor acquires near infrared information of a pixel based on
an image signal related to a light which passes the cutting portion of the filter, and
an image signal related to a light corresponding to a color of a light which passes the transmitting portion of the filter.

4. The image capturing device according to claim 1, wherein
the color filter is an arrangement type in which a plural-color 2×2 pixels arrangement is a minimum unit,
the transmitting portion of the coded infrared cut filter is arranged corresponding to particular color filter of the color filter,
the hardware image processor acquires near infrared information of a pixel based on
a particular color signal related to a light which passes the transmitting portion of the filter and
a particular color signal related to a light which passes the cutting portion of the filter.

5. The image capturing device according to claim 1, wherein
the color filter is an arrangement type in which a plural-color 2×2 pixels arrangement is a minimum unit,
the transmitting portion of the coded infrared cut filter is arranged corresponding to any color filter of a pair of minimum unit arrangements,
the image capturing device further includes code information storage unit which stores information related to the transmitting portion for each pair of minimum unit arrangements,
the hardware image processor acquires near infrared information of a pixel based on
information of a color filter corresponding to the transmitting portion,
an image signal related to a light which passes the transmitting portion, and
an image signal related to a light corresponding to a color of a light which passes the cutting portion and which passes the transmitting portion.

6. The image capturing device according to claim 1, wherein
the color filter is an arrangement type in which a plural-color 2×2 pixels arrangement is a minimum unit,
the transmitting portion of the coded infrared cut filter is arranged corresponding to a pair of minimum unit arrangements,
the hardware image processor acquires near infrared information of a pixel based on
each color signal related to a light which passes the transmitting portion, and
each color signal related to a light which passes the cutting portion.

7. An image capturing device comprising:
a color separator which separates into a plurality of lights having different bands of wavelength,
a photo sensor which is provided corresponding to each of the separated plurality of lights, and which converts the a plurality of colors into data representing image signals, a coded infrared cut filter including a cutting portion which cuts a near infrared light and a transmitting portion which passes the near infrared light, and a hardware image processor, wherein the coded infrared cut filter is provided corresponding to at least one of the separated plurality of lights, the hardware image processor acquires color information and near infrared information of a pixel based on an image signal related to a light which passes the cutting portion and an image signal related to a light which passes the transmitting portion.

8. An image capturing device comprising:

a layered sensor in which a plurality of sensors are layered and which converts a plurality of lights having different bands of wavelength into data representing image signals by each sensor, a coded infrared cut filter including a cutting portion which is provided in front of the layered sensor in the light traveling direction and which cuts a near infrared light and a transmitting portion which passes the near infrared light, and a hardware image processor which acquires color information and near infrared information of a pixel based on an image signal related to a light which passes the cutting portion and an image signal related to a light which passes the transmitting portion.

9. An image capturing method in which an image capturing device comprising:

a color filter which separates an incident light into a plurality of colors;

a photo sensor which converts the plurality of colors which the color filter has separated into data representing image signals; and a coded infrared cut filter which is provided in front of the color filter in the light traveling direction or between the color filter and the photo sensor, and which includes a cutting portion which cuts a near infrared light and a transmitting portion which passes the near infrared light acquires near infrared information of a pixel based on an image signal related to a light which passes the transmitting portion and an image signal related to a light corresponding to a color of a light which passes the cutting portion and which passes the transmitting portion.

10. A coded infrared cut filter comprising a cutting portion which cuts a near infrared light and a transmitting portion which passes the near infrared light.

11. A coded particular color cut filter comprising a cutting portion which cuts a visible light region including a band of wavelength related to a particular color and which passes a near infrared light and a transmitting portion which passes a light of the band of wavelength.

12. An image capturing device comprising:

a color filter which separates an incident light into a plurality of colors;

a photo sensor which converts the plurality of colors which the color filter has separated into data representing image signals;

a coded particular color cut filter including: a cutting portion which is provided in front of the color filter in the light traveling direction or between the color filter and the photo sensor, which cuts a visible light region including a band of wavelength related to a particular color, and which passes a near infrared light; and a transmitting portion which passes a light of the band of wavelength; and a hardware image processor which acquires plural-color information and near infrared information of a pixel based on a plurality of image signals related to lights which pass the transmitting portion and an image signal related to a light which passes the cutting portion.

13. A coded infrared cut filter comprising:

cutting portion which cuts a near infrared light; and a transmitting portion which passes the near infrared light, corresponding to a color filter of an arrangement type in which a plural-color 2×2 pixels arrangement is a minimum unit, a site to which the plurality of minimum unit arrangements in the number of N are adjacent being a basic unit, wherein in the basic unit, the transmitting portion is included in the number of N or more and a pixel position corresponding to the transmitting portion in one minimum unit arrangement and a pixel position corresponding to the transmitting portion in another minimum unit arrangement are different from each other by one or more.

14. The coded infrared cut filter according to claim 13, wherein the basic unit is composed of 4 rows and 4 columns, the transmitting portion is present for each row of the basic unit and for each column of the basic unit.

15. The coded infrared cut filter according to claim 13, wherein the transmitting portion corresponds, in the basic unit, to one R, one B, and two Gs without duplication for each row and each column.

16. An image capturing device comprising:

the coded infrared cut filter according to claim 13;

a color filter which separates an incident light into a plurality of colors;

a photo sensor which converts the plurality of colors which the color filter has separated into data representing image signals;

the coded infrared cut filter according to claim 13 which is provided in front of the color filter in the light traveling direction or between the color filter and the photo sensor; and a hardware image processor which acquires plural-color information and near infrared information of a pixel based on a plurality of image signals related to a light which passes the of a pixel and adjacent pixels and an image signal related to a light which passes the transmitting portion.

17. The image capturing device according to claim 16, further comprising:

a hardware storage which stores information related to the transmitting portion for the basic unit, the hardware image processor acquiring between the coded infrared cut filter and the color filter; and the hardware image processor correcting information related to the transmitting portion of the hardware storage based on the position shift information.

18. An image capturing method in which the image capturing device according to claim 17 acquires a pixel pattern of a near infrared information by a test irradiation, detects a position shift by comparing the near infrared pixel pattern with a pattern of the coded infrared cut filter, corrects information related to the transmitting portion based on the position shift information, and after information correction, performs image capturing.

19. The image capturing method according to claim 18, wherein when a pixel pattern of near infrared information is acquired by the test irradiation, a pixel pattern of near infrared information is acquired by comparing a test irradiation pattern in which an infrared cut filter is not arranged with a test irradiation pattern in which an infrared cut filter is arranged.

* * * * *